US011959382B2

(12) United States Patent
Phan et al.

(10) Patent No.: US 11,959,382 B2
(45) Date of Patent: Apr. 16, 2024

(54) MULTI-PIECE CORRUGATED WAVEGUIDE

(71) Applicant: Quaise Energy, Inc., Cambridge, MA (US)

(72) Inventors: Hy Phan, Houston, TX (US); Matthew Houde, Somerville, MA (US); Curtis Ardoin, Pearland, TX (US); Carlos Araque, Dorado, PR (US); Justin Lamb, Arcola, TX (US); Dennis Arnow, Los Gatos, CA (US); Ray Oliver, Westmeath (IE)

(73) Assignee: Quaise Energy, Inc., Cambridge, MA (US)

( * ) Notice: Subject to any disclaimer, the term of this patent is extended or adjusted under 35 U.S.C. 154(b) by 0 days.

(21) Appl. No.: 18/159,340

(22) Filed: Jan. 25, 2023

(65) Prior Publication Data

US 2023/0160262 A1 May 25, 2023

Related U.S. Application Data

(63) Continuation of application No. 17/367,800, filed on Jul. 6, 2021, now Pat. No. 11,613,931.

(51) Int. Cl.
*E21B 7/15* (2006.01)
*H01P 3/123* (2006.01)

(52) U.S. Cl.
CPC ................ *E21B 7/15* (2013.01); *H01P 3/123* (2013.01)

(58) Field of Classification Search
CPC ........... H01P 3/123; H01P 11/002; E21B 7/15
See application file for complete search history.

(56) References Cited

U.S. PATENT DOCUMENTS

| | | | | |
|---|---|---|---|---|
| 2,576,835 | A | 11/1951 | Hewitt, Jr. | |
| 2,848,696 | A | 8/1958 | Miller | |
| 2,950,454 | A | 8/1960 | Unger | |
| 2,991,434 | A * | 7/1961 | Lamb | H01P 5/082 333/241 |
| 3,110,001 | A | 11/1963 | Unger | |

(Continued)

FOREIGN PATENT DOCUMENTS

| | | | |
|---|---|---|---|
| EP | 0024685 | A1 | 3/1981 |
| EP | 2649681 | A1 | 10/2013 |

(Continued)

OTHER PUBLICATIONS

International Search Report and Written Opinion received for PCT Application No. PCT/US2022/036078, dated Oct. 21, 2022, 29 pages.

(Continued)

*Primary Examiner* — Andrea Lindgren Baltzell
*Assistant Examiner* — Kimberly E Glenn
(74) *Attorney, Agent, or Firm* — Mintz Levin Cohn Ferris Glovsky and Popeo, P.C.

(57) ABSTRACT

An apparatus includes a tube including an inner surface, an inner diameter, and a length. The apparatus also includes a coil spring. The coil spring includes an outer surface, an outer diameter, and a plurality of coil elements arranged along a length of the coil spring. The coil spring can be positioned within the tube and the outer diameter of the coil spring can be less than the inner diameter of the tube. The coil spring can form a waveguide. Related methods of manufacture and systems are also described herein.

10 Claims, 27 Drawing Sheets

(56) References Cited

U.S. PATENT DOCUMENTS

| | | | |
|---|---|---|---|
| 3,573,681 | A | 4/1971 | Miller |
| 3,601,720 | A | 8/1971 | Nakahara et al. |
| 3,605,046 | A | 9/1971 | Miller |
| 3,852,875 | A | 12/1974 | Mcamis et al. |
| 3,945,552 | A | 3/1976 | Tobita et al. |
| 3,970,972 | A | 7/1976 | Bunner |
| 4,231,042 | A | 10/1980 | Turrin |
| 4,673,905 | A | 6/1987 | Yamawaki et al. |
| 5,003,687 | A | 4/1991 | Lapp et al. |
| 5,704,424 | A | 1/1998 | Kohno et al. |
| 6,261,436 | B1 | 7/2001 | Chang |
| 8,393,410 | B2 | 3/2013 | Woskov et al. |
| 11,613,931 | B2 | 3/2023 | Phan et al. |
| 2003/0071699 | A1 | 4/2003 | Waltz |
| 2016/0126611 | A1 | 5/2016 | Erskine et al. |
| 2018/0209218 | A1 | 7/2018 | Hanback |

FOREIGN PATENT DOCUMENTS

| | | | |
|---|---|---|---|
| FR | 2599560 | A1 | 12/1987 |
| JP | S4891577 | A | 11/1973 |
| JP | S494182 | A | 1/1974 |
| JP | H02238705 | A | 9/1990 |
| WO | 2012076994 | A1 | 6/2012 |
| WO | 2023283167 | A1 | 1/2023 |

OTHER PUBLICATIONS

Carr et al. (1985) “Infrared and Millimeter Waves”, Millimeter Components and Techniques, Part IV, 13:1-377.

Nanni et al. (2012) “Low-loss Transmission Lines for High-power Terahertz Radiation”, Springer Science+Business Media, LLC, 695-714.

* cited by examiner

Detail A of 2620 of FIG. 26C

MULTI-PIECE CORRUGATED WAVEGUIDE

CROSS-REFERENCE TO RELATED APPLICATIONS

This Application is a continuation is U.S. patent application Ser. No. 17/367,800, filed on Jul. 6, 2021 entitled "MULTI-PIECE CORRUGATED WAVEGUIDE", the entire contents of which is incorporated herein by reference in its entirety.

TECHNICAL FIELD

The subject matter described herein relates to a waveguide for use in transmitting electromagnetic waves.

BACKGROUND

A waveguide is a structure that guides waves, such as electromagnetic waves or sound, with minimal loss of energy by restricting the transmission of energy to one direction. Waveguides can be used in non-conventional drilling techniques, such as thermal drilling and/or millimeter wave drilling, to form a borehole of a well. Waveguides can be used to transmit electromagnetic waves into the borehole to enable drilling at deeper subsurface depths than conventional, rotary drilling. Specific internal features, such as corrugated grooves, can be included in a waveguide and can enhance the transmission efficiency of the electromagnetic waves provided into the borehole. Forming and deploying corrugated waveguides in single lengths of tubes can be expensive, require specialized materials and equipment, and be prone to manufacturing errors which can result in inventory waste, operational downtime of a well, and inefficient transmission of electromagnetic energy.

SUMMARY

In one aspect, an apparatus is provided. In one embodiment, the apparatus can include a tube including an inner surface, an inner diameter, and a length. The apparatus can also include a coil spring. The coil spring can include an outer surface, an outer diameter, and a plurality of coil elements arranged along a length of the coil spring. The coil spring can be positioned within the tube and the outer diameter of the coil spring can be less than the inner diameter of the tube.

In another embodiment, a gap can be defined between the outer surface of the coil spring and the inner surface of the tube. In another embodiment, the coil spring can form a waveguide. In another embodiment, the inner surface of the coil spring can include a conductive material. In another embodiment, the coil spring can include a coating of copper, gold, silver, or platinum. In another embodiment, the apparatus can further include an insulative layer between the tube and the coil spring. In another embodiment, the outer surface of the coil spring can include a dielectric material.

In another embodiment, at least one coil element of the plurality of coil elements can be defined by one full turn of the at least one coil element with respect to a circumference of the coil spring. In another embodiment, at least one coil element of the plurality of coil elements can include a base portion and a protruding portion extending from the base portion, the protruding portion including one of a trapezoidal cross-sectional shape, a circular cross-sectional shape, a square cross-sectional shape, a rectangular cross-sectional shape, or a sinusoidal cross-sectional shape. In another embodiment, the plurality of coil elements can include one of a trapezoidal cross-sectional shape, circular cross-sectional shape, a cross-sectional rectangular shape, a cross-sectional elliptical shape, or a tapered shape along a length of the plurality of coil elements.

In another embodiment, the coil spring can include a copper wire and/or an aluminum wire. In another embodiment, the tube can include a carbon steel tube. In another embodiment, a plurality of coil springs can be positioned within the tube. In another embodiment, a first coil spring and a second coil spring of the plurality of coil springs can be coupled via a coupling spring positioned within the tube. In another embodiment, a first end of the coupling spring can be attached to a first end of the first coil spring and a second end of the coupling spring can be attached to a second end of the second coil spring, the coupling spring can be configured to reduce an amount of axial travel of the first coil spring and the second coil spring relative to one another due to thermal expansion of the first coil spring and/or the second coil spring.

In another embodiment, the coil spring and/or a cross-sectional profile of each coil element of the plurality of coil elements can be dimensioned to propagate an electromagnetic wave. In another embodiment, the coil spring and the cross-sectional profile of the coil spring can be dimensioned to propagate the electromagnetic wave in an HE11 mode. In another embodiment, the length of the tube can be greater than 1 meter. In another embodiment, the length of the tube can be greater than 5 meters. In another embodiment, the length of the tube can be greater than 9 meters.

In another embodiment, the plurality of coil elements can be dimensioned so as include a space between two or more coil elements of the plurality of coil elements, the space can be dimensioned to be ⅙ of a wavelength of an electromagnetic wave injected into the borehole of the well via the waveguide assembly. In another embodiment, the plurality of coil elements can be dimensioned so as include a pitch between two or more coil elements of the plurality of coil elements, the pitch can be dimensioned to be ⅓ of a wavelength of an electromagnetic wave injected into the borehole of the well via the waveguide assembly. In another embodiment, the plurality of coil elements can be dimensioned so as include a width dimensioned to be less than a wavelength of an electromagnetic wave injected into the borehole of the well via the waveguide assembly.

In another embodiment, the coil spring within the tube can form a helical groove. In another embodiment, the helical groove can be configured to propagate an electromagnetic wave. In another embodiment, the helical groove can be configured to propagate the electromagnetic wave in an HE11 mode, a transverse electric mode, a transverse magnetic mode, or a combination of a transverse electric mode and a transverse magnetic mode. In another embodiment, the tube can be a tapered tube and the coil spring can be a tapered coil spring. In another embodiment, the tube can be a bent tube. In another embodiment, the tube and the coil spring can be included in a casing and are configured to extend or retract from within the casing.

In another aspect, a method is provided. In one embodiment, the method can include extruding a wire including a cross-sectional profile. The method can also include forming the wire into a coil spring having an outer diameter and a plurality of coil elements arranged along a length of the coil spring. The method can further include inserting the coil spring into a tube having an inner diameter greater than the outer diameter of the coil spring, the tube can have a length along which the coil spring extends within the tube.

In another embodiment, the method can include coating the wire with a conductive material. The method can also include coating the coil spring with a conductive material. The method can further include coating an inner surface of the tube with an insulative material. In another embodiment, the conductive material can include one or more of copper, silver or gold. In another embodiment, a gap can be formed between an inner surface of the tube and an outer surface of the coil spring when the coil spring is inserted into the tube.

In another embodiment, the method can further include forming a channel on an inner surface of the tube, the channel can extend axially along the length of the tube. In another embodiment, the cross-sectional profile of the wire can include base portion and a protruding portion extending from the base portion, the protruding portion can include one of a trapezoidal profile, a circular profile, a square profile, a rectangular profile, or a sinusoidal profile. In another embodiment, forming the wire into a coil spring can include wrapping the wire around a mandrel such that a shape of each coil element of the plurality of coil elements can correspond to a cross-sectional shape of the mandrel along at least a portion of the length of the coil spring. In another embodiment, the cross-sectional shape of the mandrel can include at least one of a trapezoidal shape, circular shape, a rectangular shape, an elliptical shape, or a tapered shape.

In another embodiment, the wire can be a copper wire or an aluminum wire. In another embodiment, the method can further include forming multiple coil springs and inserting the multiple coil springs into the tube.

In another aspect, an apparatus is provided. In one embodiment, the apparatus can include an outer tube. The outer tube can have an inner surface, an inner diameter, and a length. The apparatus can also include an inner tube. The inner tube can have an inner surface, an outer surface, an outer diameter, and a helical-shaped groove formed on the inner surface and extending along a length of the inner tube. The inner tube can be positioned within the outer tube and the outer diameter of the inner tube can be less than the inner diameter of the outer tube.

In another embodiment, a gap can be defined between the outer surface of the inner tube and the inner surface of the outer tube. In another embodiment, the helical-shaped grooved can form a waveguide. In another embodiment, the inner surface of the inner tube and/or the helical-shaped groove can include a conductive material. In another embodiment, the apparatus can further include an insulative layer between the outer tube and the inner tube. In another embodiment, the outer surface of the inner tube can include a dielectric material. In another embodiment, the helical-shaped groove can be configured to propagate a millimeter electromagnetic wave. In another embodiment, the helical-shaped groove can be configured to propagate the millimeter electromagnetic wave in an HE11 mode.

In another aspect, a system is provided. In one embodiment, the system can include a waveguide assembly. The waveguide assembly can include a tube. The tube can include an inner surface, an inner diameter, and a length. The wave guide assembly can also include a coil spring. The coil spring can include an outer surface, an outer diameter, and a plurality of coil elements arranged along a length of the coil spring. The coil spring can be positioned within the tube and the outer diameter of the coil spring is less than the inner diameter of the tube. The system can also include a millimeter wave drilling apparatus. The millimeter wave drilling apparatus can include a gyrotron configured to inject millimeter wave radiation energy into a borehole of a well via the waveguide assembly.

In another embodiment, the system can include multiple waveguide assemblies underground for directing the millimeter wave radiation energy to drill a portion of the borehole or to remove material from the borehole. In another embodiment, the multiple coil springs can be stacked within one or more tubes to a distance 15 km below a surface of the well.

In another aspect, a method is provided. In one embodiment, the method can include forming a plurality of corrugation features on a first side of a sheet of metal sock. The sheet can include a first edge and a second edge. The method can also include forming the sheet of metal stock into a first tube. The method can also include welding the first edge and the second edge together to seal the first tube. The sealed first tube can form a corrugated waveguide.

In another embodiment, the method can include inserting the sealed first tube into a second tube to form a multi-piece corrugated waveguide.

In another aspect, a method is provided. In one embodiment, the method can include receiving a sheet of metal stock having a first surface, a first edge and a second edge. The method can also include receiving a corrugated element atop the first surface of the sheet of metal stock. The corrugation element can include a plurality of corrugation features. The method can further include forming the sheet of metal stock into a first tube containing the corrugation element within the first tube. The method can also include welding the first edge and the second edge together to seal the first tube. The sealed first tube can form aa multi-piece corrugated waveguide.

In another embodiment, the corrugation element is a coil spring. In another embodiment, the corrugation element is a second tube including a plurality of corrugation features formed on an inner surface of the second tube.

DESCRIPTION OF DRAWINGS

These and other features will be more readily understood from the following detailed description taken in conjunction with the accompanying drawings, in which.

Figure 1:
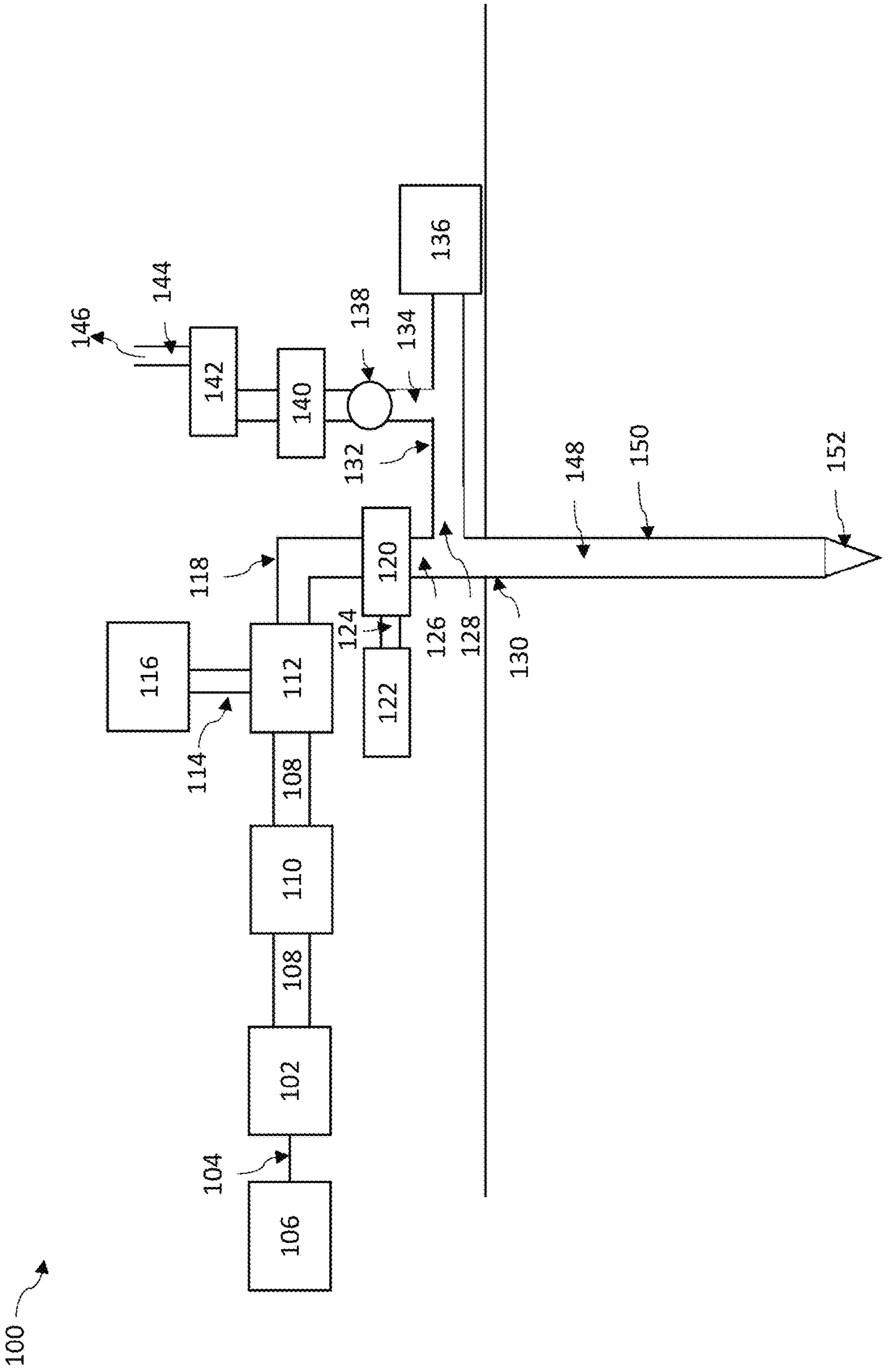
FIG. 1 is a diagram illustrating an exemplary embodiment of a millimeter wave drilling system including a multi-piece corrugated waveguide as described herein.

It is noted that the drawings are not necessarily to scale. The drawings are intended to depict only typical aspects of the subject matter disclosed herein, and therefore should not be considered as limiting the scope of the disclosure.

DETAILED DESCRIPTION

A waveguide is a structure that guides waves, such as electromagnetic waves or sound, with minimal loss of energy by restricting the transmission of energy to one direction. Waveguides can be employed, for example, in millimeter wave drilling operations, to efficiently convey electromagnetic waves to depths necessary to form a well. The design and materials used to form the waveguide can affect the transmission efficiency of the electromagnetic waves transmitted in a particular transmission mode. For example, radio frequency (RF) waves can be transmitted over long distances using a waveguide including a series of corrugated features. The corrugated features can include a pattern of repeating ridges or grooves that can extend within a length of a tube. The pattern of corrugated features (e.g., ridges, grooves, or the like) can be shaped to aid the propagation of the electromagnetic wave and can be dimensioned according to the properties (e.g., frequency) of the wave that the waveguide is designed to efficiently propagate. Often, corrugated waveguides can include a dielectric or conductive coating that can improve the transmission efficiency of the waveguide.

Some existing approaches to forming a corrugated waveguide include machining, rotary cutting, tapping, or boring an inner surface of a tube to form the corrugation features.

Stacks of rings can also be configured within a tube to form the corrugation features. But these approaches can be difficult to perform for long waveguide lengths and therefore can result in errors in the dimensions of the corrugated features. These errors can reduce the transmission efficiency of the waveguide.

In addition, forming waveguides having long lengths using some existing methods can leave residual materials, such as turnings, burrs, or the like that can also reduce the transmission efficiency of the waveguide. And some existing methods are not amenable to subsequent machining of long lengths of tube to correct defects of the corrugated features. Thus repair and replacement costs of waveguides formed in long tubes using some traditional methods can be high. And coating inner surfaces of long lengths of tube (and the corrugation features therein), for example with a conductive coating, can be challenging, expensive, and labor intensive.

The multi-piece corrugated waveguide described herein can be employed in a variety of industries and applications wherein electromagnetic waves are transmitted, such as oil and gas production industry, nuclear energy, fusion reactors, drilling and mining operations, and sound or audio applications. The design and manufacturing approach of the multi-piece corrugated waveguide can provide a less expensive alternative for any industry or application compared to purchasing long corrugated waveguides with configured corrugation features formed via traditional manufacturing methods. Accordingly, some implementations of the current subject matter can include a multi-piece corrugated waveguide formed of a coil spring arranged within a tube. The coil spring can be shaped to provide the corrugation features of the waveguide while the tube can provide structural support. By utilizing a coil spring inside of a tube as a waveguide, longer-length waveguides can be produced without the errors in dimensions of the corrugated features that are introduced by some existing approaches to forming waveguides. And by reducing errors in dimensions of the corrugated features, the waveguide can more efficiently propagate electromagnetic waves (e.g., millimeter waves) thereby resulting in an improved waveguide.

In some embodiments, the multi-piece corrugated waveguide can be configured for use in millimeter wave drilling during formation of a well. In some implementations, the coil springs and inner surfaces of the tube can be coated with, for example, a conductive coating. The transmission efficiency of some implementations of the multi-piece corrugated waveguide described herein can also be improved by dimensioning features of the coil springs, such as a width, a depth, and a pitch of the coil springs in regard to a particular transmission mode. Some implementations of the multi-piece corrugated waveguide described herein can provide efficient transmission of electromagnetic waves in a variety of transmission modes.

Some implementations of the multi-piece corrugated waveguide described herein can be formed by assembling multiple individual components. In some implementations, each of the individual components can be formed with greater precision, compared to existing methods of machining corrugation features within single, long pieces of tube. Forming components individually can ensure that the corrugation features have been formed with the desired properties necessary for efficient and frequency dependent electromagnetic wave transmission. And individually manufacturing components of some implementations of the multi-piece corrugated waveguide described herein can reduce operating and maintenance costs because the coil spring and tube can be assembled together in a greater range of tube lengths compared to machining fixed lengths of tube.

In some implementations, repair and replacement costs can be reduced since the coil springs can be easily removed and replaced within a tube. In contrast, repair and replacement costs can be higher for existing methods as re-machining long lengths of tube can require specialized equipment and extensive downtime. In addition, re-machining the tube multiple times can result in insufficient material remaining to reform the desired corrugation features of the waveguide.

FIG. 1 is a diagram illustrating an exemplary embodiment of a millimeter wave drilling (MMWD) system 100 including an example multi-piece corrugated waveguide 108. The MMWD system 100 shown in FIG. 1 includes a gyrotron 102 connected via power cable 104 to a power supply 106 supplying power to the gyrotron 102. The high power millimeter wave beam output by the gyrotron 102 is guided by a waveguide 108, such as a multi-piece corrugated waveguide described herein. The waveguide 108 can include a waveguide bend 118, a window 120, a waveguide section 126 with opening 128 for off gas emission and pressure control. A section of the waveguide is below ground 130 to help seal the borehole.

As part of the waveguide 108 transmission line there is an isolator 110 to prevent reflected power from returning to the gyrotron 102 and an interface for diagnostic access 112. The diagnostic access is connected to diagnostics electronics and data acquisition 116 by low power waveguide 114. At the window 120 there is a pressurized gas supply unit 122 connected by plumbing 124 to the window to inject a clean gas flow across the inside window surface to prevent window deposits. A second pressurization unit 136 is connected by plumbing 132 to the waveguide opening 128 to help control the pressure in the borehole 148 and to introduce and remove borehole gases as needed. The window gas injection unit 122 can be operated at slightly higher pressure relative to the borehole pressure unit 136 to maintain a gas flow across the window surface. A branch line 134 in the borehole pressurization plumbing 132 can be connected to a pressure relief valve 138 to allow exhaust of volatized borehole material and window gas through a gas analysis monitoring unit 140 followed by a gas filter 142 and exhaust duct 144 into the atmosphere 146. In some embodiments, the exhaust duct 144 can return the gas to the pressurization unit 136 for reuse.

Pressure in the borehole can be increased in part or in whole by the partial volatilization of the subsurface material being melted. A thermal melt front 152 at the end of the borehole 148 can be propagated into the subsurface strata under the combined action of the millimeter wave power and gas pressure leaving behind a ceramic (e.g., glassy) borehole wall 150. This wall can act as a dielectric waveguide to transmit the millimeter wave beam to the thermal front 152.

Figure 2:
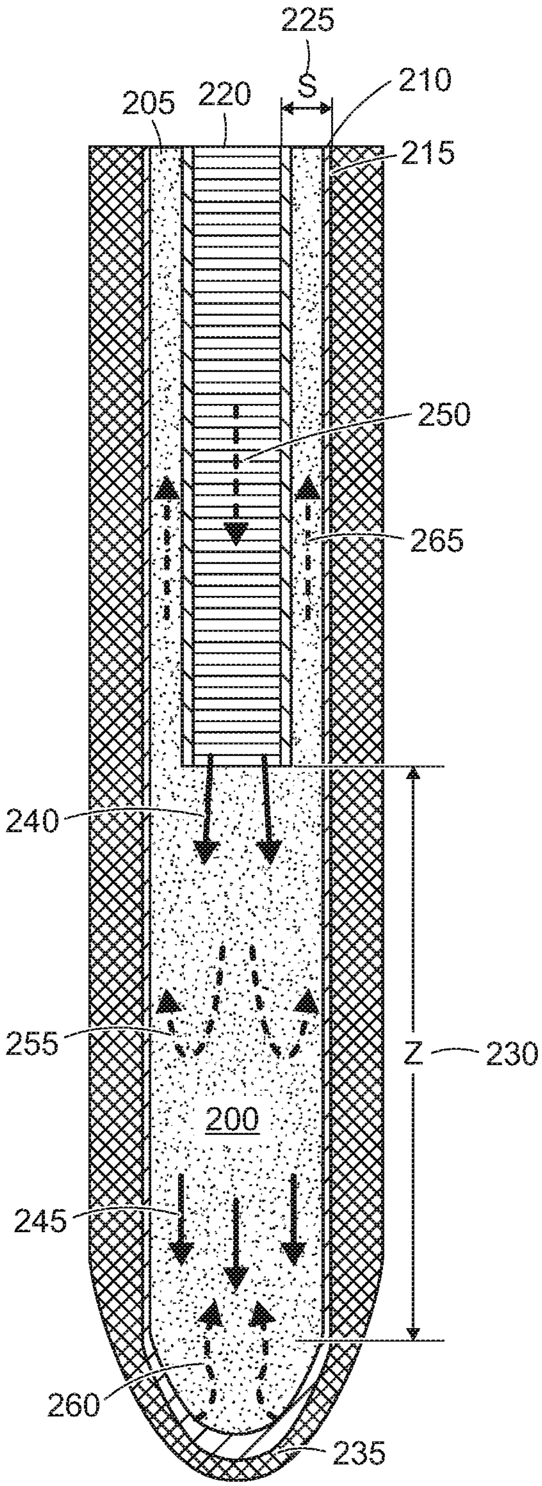
FIG. 2 is a diagram illustrating a cross sectional view of a borehole including a waveguide for low loss transmission of millimeter wave radiation as described herein.

FIG. 2 is a diagram illustrating a cross sectional view of an example borehole including a multi-piece corrugated waveguide, which can be configured for low loss transmission of millimeter wave radiation. FIG. 2 provides a more detailed view of MMWD and corresponds to the MMWD system described in U.S. Pat. No. 8,393,410 to Woskov et. al, entitled "Millimeter-wave Drilling System." The borehole 200 with annulus 205, glassy/ceramic wall 210 and permeated glass 215 has a waveguide assembly 220 inserted to improve the efficiency of millimeter wave beam propagation. In some embodiments, the waveguide assembly can include a multi-piece corrugated waveguide as will be described herein. In some embodiments, multiple waveguide assemblies can be inserted into the borehole. For example, multiple waveguide assemblies can be stacked upon one another to a distance of 1 km, 5 km, 10 km or more below a surface of a well.

As shown in FIG. 2, the diameter of the waveguide assembly 220 can be smaller than the borehole diameter to create an annular gap 225 for exhaust/extraction. The standoff distance 230 of the leading edge of the multi-piece corrugated waveguide 220 from the thermal melt front 235 of the borehole is far enough to allow the launched millimeter wave beam divergence 240 to fill 245 the dielectric borehole 200 with the guided millimeter-wave beam. The standoff distance 230 is also far enough to keep the temperature at the waveguide assembly 220 low enough for survivability. The inserted waveguide assembly 220 also acts as a conduit for a pressurized gas flow 250 from the surface. This gas flow keeps the waveguide clean and contributes to the extraction/displacement of the rock material from the bore hole. The gas flow from the surface 250 mixes 255 with the volatilized out gassing of the rock material 260 to carry the condensing rock vapor to the surface through annular space 225. The exhaust gas flow 265 is sufficiently large to limit the size of the volatilized rock fine particulates and to carry them all the way to the surface.

Figure 3:
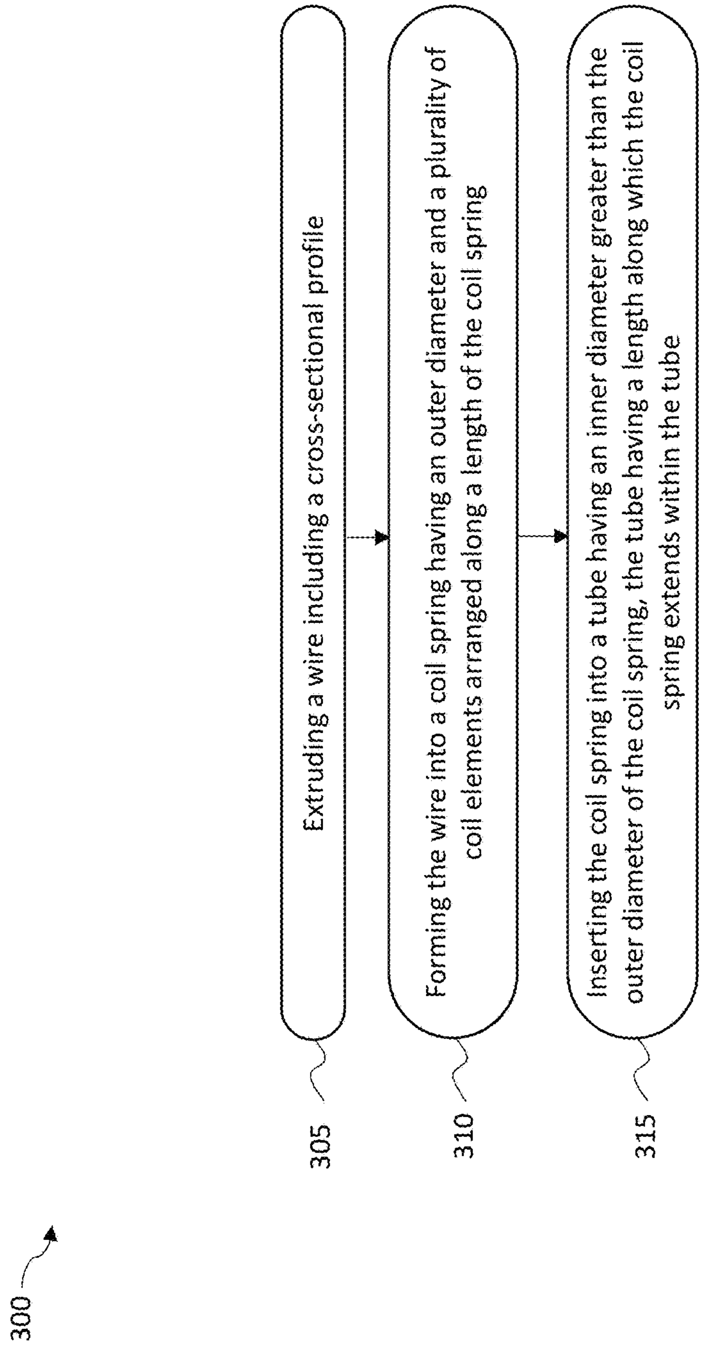
FIG. 3 is a flowchart illustrating one exemplary embodiment of a method for forming a multi-piece corrugated waveguide as described herein.

FIG. 3 is a flowchart illustrating one exemplary embodiment of a method for forming a multi-piece corrugated waveguide as described herein. At 305, a wire including a cross-sectional profile can be extruded. Extruding or roll forming a wire to form a coil spring (e.g., the corrugated features of the waveguide described herein) can advantageously improve the quality of the manufactured waveguide because the extrusion is less likely to leave burrs or machined material within the waveguide compared to traditional methods which can machine, tap, or otherwise bore corrugated grooves on an inner surface of the waveguide. The wire can be made from any standard metal or non-metal material. In some embodiments, the wire can include a metal wire or other electrically conductive material, such as a copper wire, aluminum wire or copper chromium zirconium alloy wire. The extrusion can form a cross-sectional profile of the wire. The cross-sectional profile can include a base portion and protruding portion extending from the base portion, as shown and described in relation to FIGS. 19-25.

The base portion and the protruding portion can include profiles that can be shaped in a variety of geometries and dimensions. For example, in some embodiments, the profile of the protruding portion can include a trapezoidal profile, a circular profile, a square profile, a rectangular profile, or a sinusoidal profile. In some embodiments, the base portion can include a rectangular profile or a curved profile. Other profile shapes are possible.

The protruding portion can include a width and a depth which can correspond to a mode and/or frequency of electromagnetic waves which are transmitted through the multi-piece corrugated waveguide described herein. For example, the width and depth of the protruding portion can be formed to correspond to the optimum transmission of electromagnetic waves, such as millimeter waves and microwaves in HE11 mode or any other modes with low attenuation.

The width and depth of the protruding portion of the corrugated waveguide can be configured with respect to a frequency of the waves transmitted through the waveguide. For example, for optimal transmission in the HE11 mode, the width of the corrugations can be less than a sixth of the wavelength and the depth of the corrugations can be approximately a quarter of the wavelength of the beam. For other modes of propagation, the corrugations can take different geometrical characteristics.

At 310, the wire can be formed into a coil spring having an outer diameter and a plurality of coil elements arranged along a length of the coil spring. In some embodiments, the coil spring can be formed by wrapping the wire around a form, such as a mandrel, to form the wire into the coil spring. In this way, a cross-sectional shape of the coil spring (e.g., the shape observed when viewing the coil spring from a perspective that is parallel with an axis extending along a length of the coil spring) and the shape of each coil element of the coil spring can correspond to a cross-sectional shape of the mandrel (e.g., the shape observed when viewing the mandrel from a perspective that is parallel with an axis extending along a length of the mandrel). The cross-sectional shape of the mandrel (and thus, the cross-sectional shape of a coil element, a plurality of coil elements, and a coil spring) can include a trapezoidal shape, a circular shape, a rectangular shape, a square shape, or an elliptical shape, for example, as shown in FIGS. 18A-18E. Other shapes are possible.

In some embodiments, the coil spring can be a tapered coil spring that can be formed using a tapered mandrel. In some embodiments, the cross-sectional shape of a plurality of coil elements and thus, the coil spring, can vary along the length of the plurality of coil elements and/or the coil spring. In some embodiments, the coil spring can include multiple cross-sectional profiles along the length of the coil spring.

A coil element of the coil spring can correspond to a single turn of the wire around the mandrel. Each coil element can have a circumference and a diameter. The diameter of each coil element can correspond to the diameter of the coil spring and the plurality of coil elements forming the coil spring. As shown in regard to FIG. 17A, a plurality of coil elements can include a pitch defined between a center of two coil springs. The pitch can correspond to a mode and/or frequency of electromagnetic waves which are transmitted through the multi-piece corrugated waveguide described herein. In addition, the coil element can include a protruding portion. The protruding portion can be formed with a width and a depth to correspond to optimal transmission of millimeter waves in HE11 mode, for example. Profiles of coil elements illustrating the width and depth of the protruding portion are shown and described in relation to FIGS. 19-25.

Figure 17A:
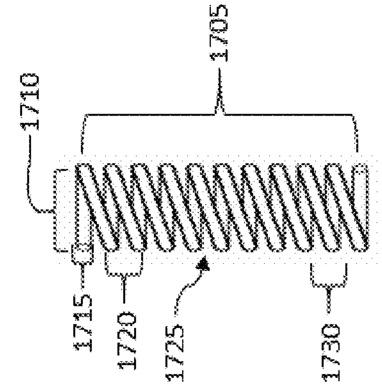
FIGS. 17A-17G are diagrams illustrating exemplary embodiments of coil springs included in a multi-piece corrugated waveguide as described herein.
Figure 17B:
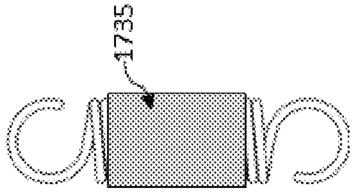
Figure 17C:
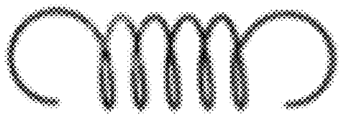

In some embodiments, the coil spring can be formed as a compression spring or an extension spring. Depending on the desired pitch between coil elements, it can be advantageous to use a compression spring (e.g., a coil spring having a larger pitch between coil elements as shown in FIG. 17A) instead of an extension spring (e.g., a coil spring having a smaller pitch between coil elements as shown in FIG. 17B). In some embodiments, multiple coil springs can be formed in the manner described in relation to operation 310. In some embodiments, the coil spring can be formed to include an attachment point at each end of the coil spring, so that multiple coil springs can be linked or joined together, as shown in FIGS. 17B and 17C. For example, the attachment points can include semi-circular attachment points configured at each end of the coil spring. The semi-circular attachment point at one end of one coil spring can couple with a semi-circular attachment point at a one end of another, adjacent coil spring.

At 315, the coil spring can be inserted into a tube. The tube can provide structural rigidity to the coil spring and can be designed to provide gas or liquid tight (e.g., pressurized) containment. In some embodiments, the tube can be a continuous tube, a coil tubing product, or a pipe tubing product. In some embodiments, the tube can be a gas injector or pump out device. The tube can have an inner diameter that can be greater than the outer diameter of the coil spring. The tube can have a length along which the coil can extend within the tube. When inserted into the tube, the coil spring can form a plurality of corrugation features within the tube, as illustrated in FIGS. 5-8, 12-13, and 14A-14B. The corrugation features can enable the coil spring and tube to transmit electromagnetic waves there through efficiently in a variety of transmission modes, such as HE11 mode. The corrugation features can be further defined as a result of extruding the wire with a particular cross-sectional profile and pitch so that the transmission efficiency is achieved by the coil spring within tube and the cross-sectional profile of the plurality of coil elements. In some embodiments, the tube can be formed from a metallic or non-metallic material. In some embodiments, the tube can be formed from carbon steel, stainless steel, Inconel, titanium alloys, molybdenum alloys, tungsten alloys, copper alloys, aluminum alloys, or copper chromium zirconium. In some embodiments, multiple coil springs can be inserted into the tube.

In some embodiments, a gap can be formed between an inner surface of the tube and an outer surface of the coil spring when the coil spring is inserted into the tube, as illustrated in FIGS. 5-8, and 12-13. The gap can enable variations in the coil spring materials due to thermal expansion during electromagnetic wave transmission through tube and coil spring. The gap allows gas from the surface to flow down to the bottom of the borehole while allowing cooling of the corrugation on the inside and outside of the coiled spring, which cannot be achieved with conventional waveguide pipe. The tube can act as an additional barrier for any electromagnetic waves which may leak through the coil spring to the environment. In some embodiments, a channel can be formed on an inner surface of the tube and can enable gas flow from the surface to be bottom of the borehole. In some embodiments, the channel can extend axially along the length of the tube.

Figure 4:
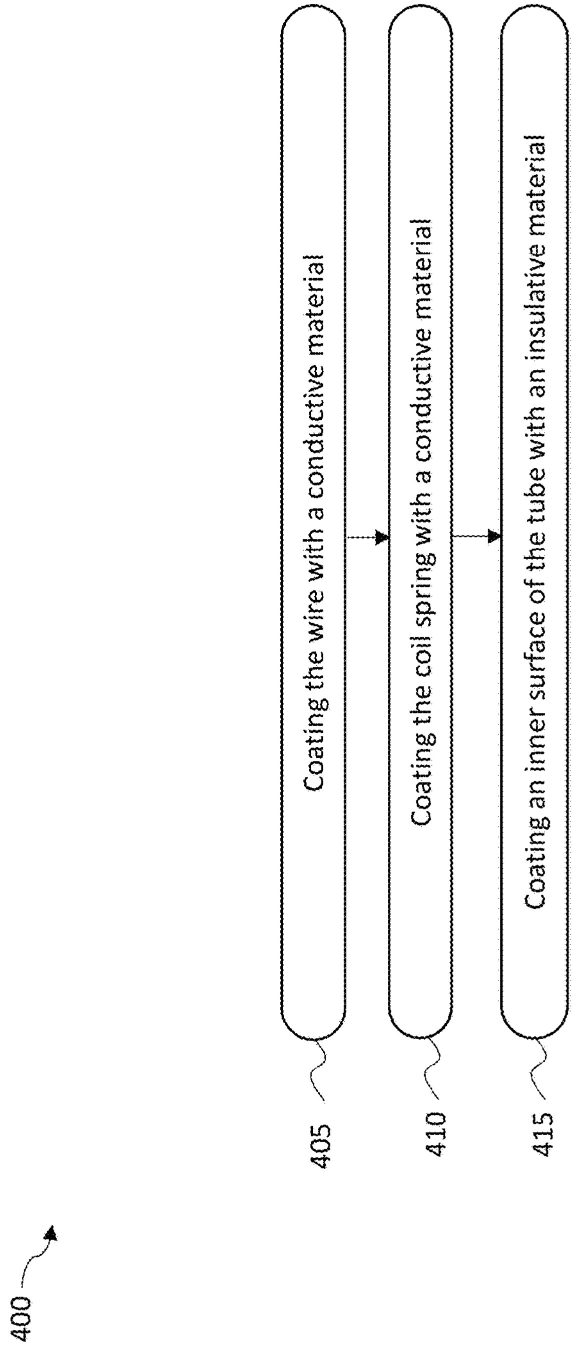
FIG. 4 is a flowchart illustrating one exemplary embodiment of a method for coating portions of a multi-piece corrugated wave guide as described herein.

FIG. 4 is a flowchart illustrating one exemplary embodiment of a method 400 for coating portions of a multi-piece corrugated wave guide as described herein. Coating or dipping portions of the multi-piece corrugated waveguide described herein can increase the transmission efficiency of transmitted electromagnetic waves and can aid in managing thermal conditions within the multi-piece corrugated waveguide. Compared to traditional methods of coating the inner surfaces of long tubes that have been bored or machined to form corrugated waveguide features within the long tubes, it can be easier to coat portions of the multi-piece corrugated waveguide described herein because the coil spring and tube can be formed separately and can be coated separately. In addition, the use of shorter length coil springs described herein can also make application of coating materials easier prior to insertion into the tube.

At 405, the wire can be coated with a conductive material. In some embodiments, the wire can be coated with an electrically conductive material such as copper, silver, platinum, or gold. The process of coating can include vapor deposition, chemical or electrochemical coating, spraying, rolling, dipping, applying a film, or the like. In some embodiments, the wire can be coated with a dielectric material.

At 410, the coil spring can be coated with a conductive material. In some embodiments, an outer diameter of the coil spring can be coated with a conductive material, as shown in FIG. 17B. In some embodiments, the coil spring can be coated with an electrically conductive material such as copper, silver, platinum, or gold. In some embodiments, the coil spring can be coated with a dielectric material. The process of coating can include vapor deposition, chemical or electrochemical coating, spraying, rolling, dipping, applying a film, or the like.

Figure 8:
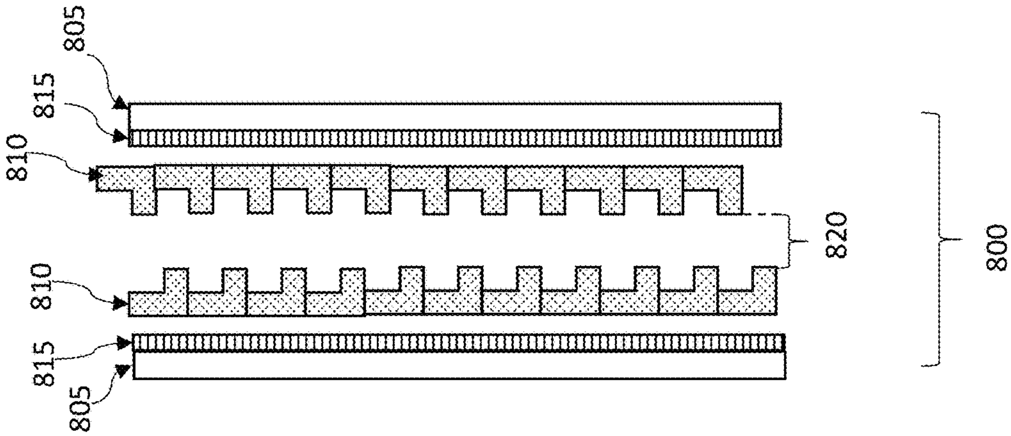
FIG. 8 is a diagram illustrating a cross-sectional view of an exemplary embodiment of a multi-piece corrugated waveguide including a dielectric material and/or a thermal insulative material on an inner surface of a tube of a multi-piece corrugated waveguide as described herein.

At 415, an inner surface of the tube can be coated with an insulative material. For example as shown in FIG. 8, the inner surface of the tube can be coated with a dielectric material. Insulative material can be thermally insulative and can be used between the inner surface of the tube and the outer surface of the coil spring to separate the heat in the wellbore annulus 205 from the coil spring. This can allow purge gas from the surface to cool the coil springs all the way down to the bottom of the borehole without losing cooling capability due to the interaction with the inner surface of the tube (which is in contact with hot gas rising up through the annulus 205). In some embodiments, the insulative material can include fiberglass, open cell foam, closed cell foam, polystyrene, ceramic fiber, carbon composite, silica fiber, rockwool, or the like.

While the multi-piece corrugated waveguide is described herein in relation to drilling operations, embodiments of the multi-piece corrugated waveguide herein can be deployed in a variety of other configurations to transmit electromagnetic waves. While drilling operations can require insertion of the MCG into the ground and possibly flowing a gas in or around the MCG, other applications of embodiments of the MCG described here can be performed using an above-ground, stationary arrangement of the MCG. For example, in nuclear energy or sound transmission applications, the MCG can be configured on an above-ground surface and positioned relative to a target at which electromagnetic waves are to be transmitted.

Figure 5:
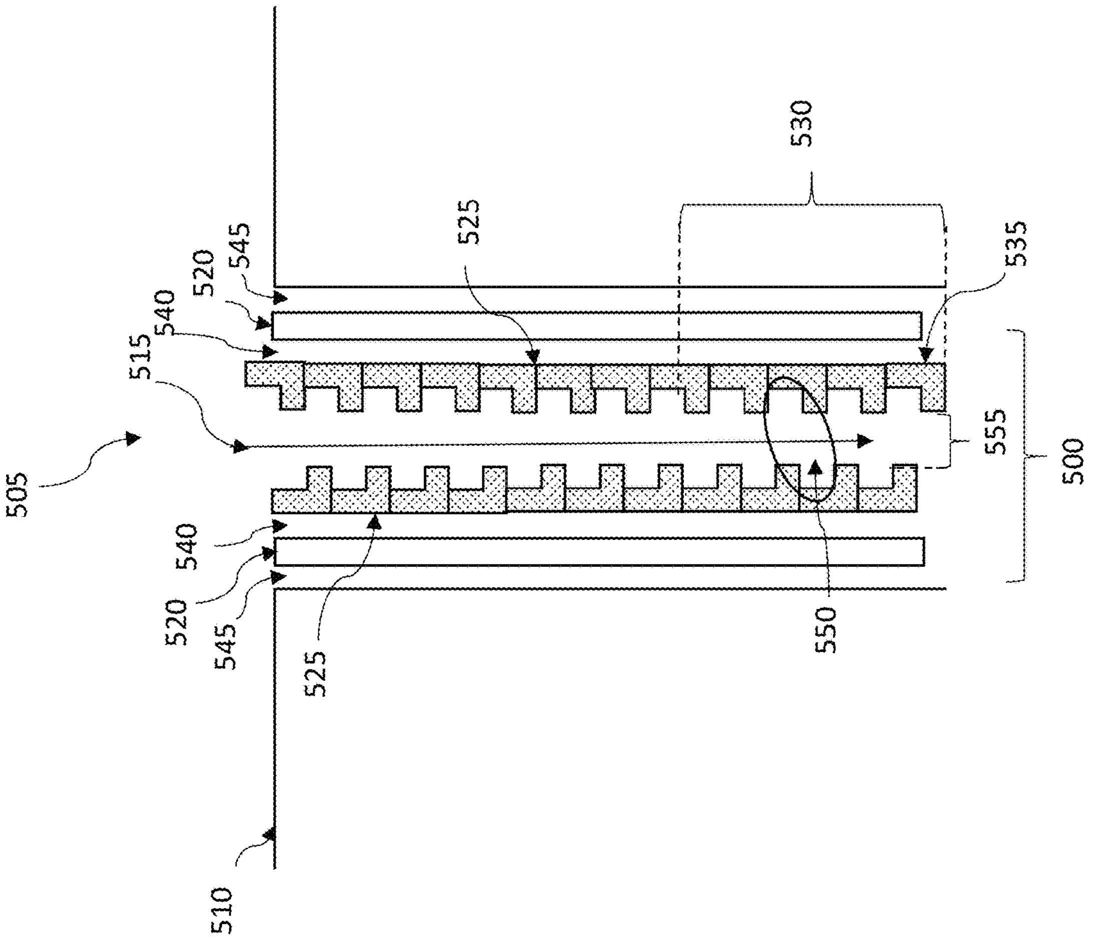
FIG. 5 is a diagram illustrating a cross-sectional view of an exemplary embodiment of a multi-piece corrugated waveguide as described herein.

FIG. 5 is a diagram illustrating a cross-sectional view of an exemplary embodiment of a multi-piece corrugated waveguide 500 as described herein. Some implementations of the multi-piece corrugated waveguide (MCG) described herein can be formed according to methods 300 and 400 described in relation to FIGS. 3 and 4. The example MCG described herein can be configured for operation within the system 100 described in relation to FIG. 1 and for deployment in the borehole 200 described in relation to FIG. 2.

As shown in FIG. 5, the MCG 500 can be deployed into a borehole 505 at a surface 510 at which a well or other subsurface drilling operation is being performed. The MCG 500 can convey electromagnetic energy 515, such as RF waves, into the borehole 505. The MCG 500 can include a tube 520 and a coil spring 525 positioned within the tube 520. The tube 520 can include an inner surface, an outer surface, an inner diameter defined between opposing inner surfaces, an outer diameter defined between opposing outer surfaces, and a length defined between a first end of the tube 520 and a second end of the tube 520. In some embodiments, the length of the tube 520 can be greater than one meter, greater than 5 meters, or greater than 9 meters. In embodiments where the tube includes a continuous tube, a coil tubing product, or a pipe tubing product the length of the tube 520 can be greater than 10 km. When forming a borehole, 10s and 100s of tubes 520 can be deployed to reach sufficient depths necessary to form a well.

The coil spring 525 can include a plurality of coil elements 530 arranged along a length of the tube 520 and can form a waveguide. The plurality of coil elements 530 can include two or more coil elements 535. The coil spring 525 can include an outer surface interfacing with the inner surface of the tube 520 and an outer diameter defined between opposing outer surfaces of the coil spring 525. The outer diameter of the coil spring 525 can be less than the inner diameter of the tube 520.

As shown in FIG. 5, a gap 540 can be defined between an outer surface of the coil spring 525 and the inner surface to the tube 520. The gap can enable the coil spring 525 to expand within the tube 520 as a result of thermal expansion of the coil spring 525 during electromagnetic wave transmission through MCG 500. The gap 540 can also allow gas to pass from the surface to the bottom of the borehole. Additionally, a second gap 545 can be defined between the outer surfaces of the tube 520 and the walls of the borehole 505.

In some embodiments, the coil spring 525, as well as a cross-sectional profile of each of the coil elements 535 can be dimensioned to propagate electromagnetic waves through the MCG 500. For example, the coil spring 525 and the cross-sectional profile of the coil elements 535 can be formed and dimensioned to propagate a millimeter electromagnetic wave with low attenuation. The coil spring 525 and the cross-sectional profile of the coil elements 535 can be dimensioned to transmit the electromagnetic wave in one or more transmission modes. For example, the coil spring 525 and the cross-sectional profile of the coil elements 535 can be dimensioned to transmit the millimeter electromagnetic wave in HE11 mode.

In some embodiments, the coil spring 525 and the cross-sectional profile of the coil elements 535 can be dimensioned based on a wavelength and/or a frequency of the transmitted electromagnetic wave.

As shown in FIG. 5, the coil spring 525 can form a helical groove 550. In some implementations, the helical groove 550 can extend continuously along the length of the coil spring 525 on the inner surface of the coil spring 525. The helical groove 550 can be formed by opposing and protruding portions of each coil element 535. In some embodiments, the coil spring 525 can include an inner diameter 555 measured between protruding portions of each coil element 535. In some embodiments, the inner diameter 555 can include a diameter of 5.0 mm-15.0 mm, 10.0 mm-20.0 mm, 15.0 mm-25.0 mm, 20.0 mm-30.0 mm, 25.0 mm-35.0 mm, 30.0 mm-40.0 mm, 45.0 mm-55.0 mm, 50.0 mm-60.0 mm, 55.0 mm-65.0 mm, 60.0 mm-70.0 mm, 65.0 mm-75.0 mm, 70.0 mm-80.0 mm, 75.0 mm-90.0 mm, or 85.0 mm-200.0 mm. In some embodiments, the inner diameter can be greater than 200.0 mm or less than 5.0 mm. Other inner diameters are possible. In some embodiments, the inner diameter 555 can include a tolerance range, such as +/−0.075 mm, +/−0.1 mm, +/−0.125 mm, +/−0.150 mm, +/−0.175 mm, or +/−0.2 mm, +/−0.225 mm, or +/−0.25 mm, although other tolerance ranges are possible.

Figure 6:
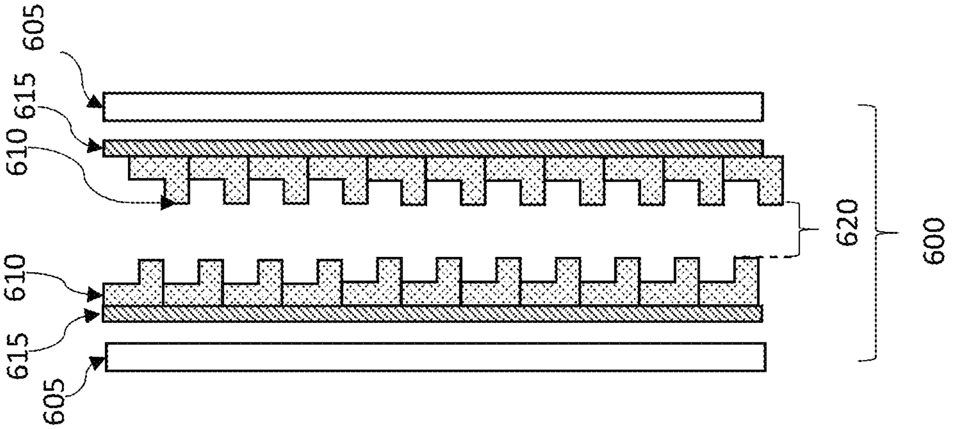
FIG. 6 is a diagram illustrating a cross-sectional view of an exemplary embodiment of a multi-piece corrugated waveguide including a dielectric material and/or a thermal insulative material on an outer surface of a coil spring of a multi-piece corrugated waveguide as described herein.

FIG. 6 is a diagram illustrating a cross-sectional view of an exemplary embodiment of a multi-piece corrugated waveguide 600 including a dielectric material and/or a thermal insulative material on an outer surface of a coil spring of a multi-piece corrugated waveguide as described herein. As shown in FIG. 6, the MCG 600 can include a tube 605, a coil spring 610, and a dielectric material 615 on the outer surface of the coil spring 610. In some embodiments, the dielectric material can include glass, ceramics, porcelain and most plastics. The dielectric material 615 can be applied to the outer diameter of the coil spring 610 as a coating or the dielectric material 615 can be a standalone component that is added to the assembled MCG 600. The dielectric material 615 can electrically isolate the tube 605 from the coil spring 610 and prevent electrical shorting between them.

In some embodiments, the coil spring 610 can include an inner diameter 620 measured between protruding portions of each coil element of the coil spring 610. In some embodiments, the inner diameter 620 can include a diameter of 5.0 mm-15.0 mm, 10.0 mm-20.0 mm, 15.0 mm-25.0 mm, 20.0 mm-30.0 mm, 25.0 mm-35.0 mm, 30.0 mm-40.0 mm, 45.0 mm-55.0 mm, 50.0 mm-60.0 mm, 55.0 mm-65.0 mm, 60.0 mm-70.0 mm, 65.0 mm-75.0 mm, mm-80.0 mm, 75.0 mm-90.0 mm, or 85.0 mm-200.0 mm. In some embodiments, the diameter can be greater than 200.0 mm or less than 5.0 mm. Other diameters are possible. In some embodiments, the inner diameter 620 can include a tolerance range, such as +/−0.075 mm, +/−0.1 mm, +/−0.125 mm, +/−0.150 mm, +/−0.175 mm, +/−0.2 mm, +/−0.225 mm, or +/−0.25 mm, although other tolerance ranges are possible.

Figure 7:
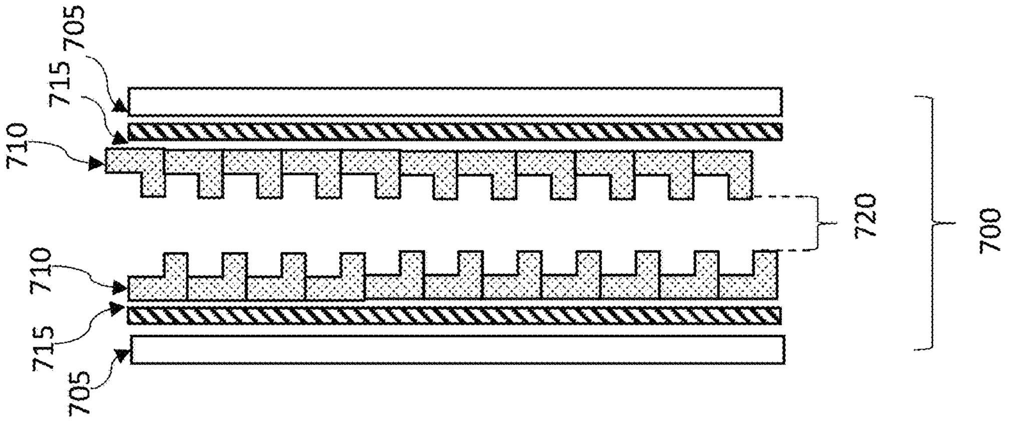
FIG. 7 is a diagram illustrating a cross-sectional view of an exemplary embodiment of a multi-piece corrugated waveguide including an insulative layer between a tube and a coil spring of a multi-piece corrugated waveguide as described herein.

FIG. 7 is a diagram illustrating a cross-sectional view of an exemplary embodiment of a multi-piece corrugated waveguide 700 including an insulative layer between a tube and a coil spring of a multi-piece corrugated waveguide as described herein. As shown in FIG. 7, the MCG 700 can include a tube 705, a coil spring 710, and an insulative layer 715. The insulative layer 715 can be thermally insulative and can be positioned between the tube 705 and the coil spring 710. In some embodiments, the insulative layer can be formed from an insulative material, such as fiberglass, open/closed cell foam, polystyrene, ceramic fiber, carbon composite, silica fiber, rockwool, or the like. Insulative materials can be positioned in between the inner surface of the tube 705 and the outer surface of the coil spring 710 to separate the heat in a wellbore annulus 205 from the coil spring 710. This can allow purge gas from the surface to cool the coil spring 710 all the way down to the bottom of the borehole without losing cooling capability due to the interaction with the inner surface of the tube 705 (which is in contact with hot gas rising up through the annulus 205).

In some embodiments, the coil spring 710 can include an inner diameter 720 measured between protruding portions of each coil element of the coil spring 710. In some embodiments, the inner diameter 720 can include a diameter of 5.0 mm-15.0 mm, 10.0 mm-20.0 mm, 15.0 mm-25.0 mm, 20.0 mm-30.0 mm, 25.0 mm-35.0 mm, 30.0 mm-40.0 mm, 45.0 mm-55.0 mm, 50.0 mm-60.0 mm, 55.0 mm-65.0 mm, 60.0 mm-70.0 mm, 65.0 mm-75.0 mm, 70.0 mm-80.0 mm, 75.0 mm-90.0 mm, or 85.0 mm-200.0 mm. In some embodiments, the diameter can be greater than 200.0 mm or less than 5.0 mm. Other diameters are possible. In some embodiments, the inner diameter 720 can include a tolerance range, such as +/−0.075 mm, +/−0.1 mm, +/−0.125 mm, +/−0.150 mm, +/−0.175 mm, +/−0.2 mm, +/−0.225 mm, or +/−0.25 mm, although other tolerance ranges are possible.

FIG. 8 is a diagram illustrating a cross-sectional view of an exemplary embodiment of a multi-piece corrugated waveguide 800 including a dielectric material and/or thermal insulative material on an inner surface of a tube of a multi-piece corrugated waveguide as described herein. As shown in FIG. 8, the MCG 800 can include a tube 805, a coil spring 810, and a dielectric material 815 on an inner surface of the tube 815. In some embodiments, the dielectric material and/or thermal insulative material can include fiberglass, open/closed cell foam, polystyrene, ceramic fiber, carbon composite, silica fiber, rockwool, or the like.

In some embodiments, the coil spring 810 can include an inner diameter 820 measured between protruding portions of each coil element of the coil spring 810. In some embodiments, the inner diameter 820 can include a diameter of 5.0 mm-15.0 mm, 10.0 mm-20.0 mm, 15.0 55.0 mm-25.0 mm, 20.0 mm-30.0 mm, 25.0 mm-35.0 mm, 30.0 mm-40.0 mm, 45.0 mm-70.0 mm, 50.0 mm-60.0 mm, 55.0 mm-65.0 mm, 60.0 mm-70.0 mm, 65.0 mm-75.0 mm, mm-80.0 mm, 75.0 mm-90.0 mm, or 85.0 mm-200.0 mm. In some embodiments, the diameter can be greater than 200.0 mm or less than 5.0 mm. Other diameters are possible. In some embodiments, the inner diameter 820 can include a tolerance range, such as +/−0.075 mm, +/−0.1 mm, +/−0.125 mm, +/−0.150 mm, +/−0.175 mm, +/−0.2 mm, +/−0.225 mm, or +/−0.25 mm, although other tolerance ranges are possible.

Figure 9:
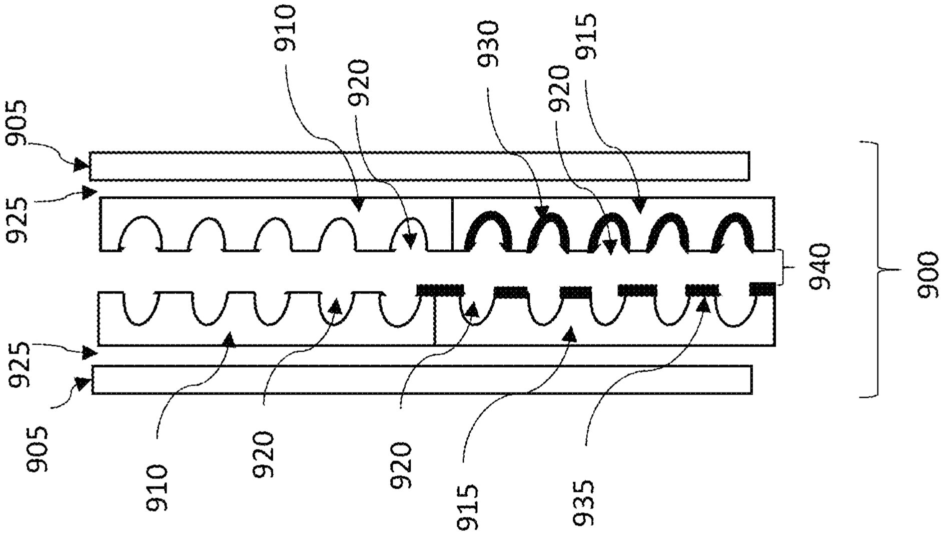
FIG. 9 is a diagram illustrating a cross-sectional view of an exemplary embodiment of a multi-piece corrugated waveguide including an inner tube having a helical groove formed on an inner surface of the inner tube as described herein.

FIG. 9 is a diagram illustrating a cross-sectional view of an exemplary embodiment of a multi-piece corrugated waveguide 900 including an inner tube having a helical groove formed on an inner surface of the inner tube as described herein. As shown in FIG. 9, the MCG 900 can include an outer tube 905. The outer tube 905 can include an inner surface, an inner diameter defined between opposing inner surfaces, and a length defined between a first end of the tube 905 and a second end of the tube 905. The MCG 900 can also include one or more inner tubes, such as inner tubes 910 and 915. Each inner tube can include an inner surface, an outer surface, an outer diameter defined between opposing outer surfaces, and a helical-shaped groove 920 formed on the inner surface of the inner tube(s) 910 and 915. The inner tube(s) 910 and 915 can be positioned within the outer tube 905 as a result of the outer diameter of the inner tube(s) 910 and 915 being less than the inner diameter of the outer tube 905. In some embodiments, for example, when multiple inner tubes are positioned within the outer tube 905, two or more inner tubes 910 and 915 can be joined via a threaded connection, via welding one inner tube to a second inner tube, or via bolting one inner tube to a second inner tube. In some embodiments, the inner tube(s) 910 and/or 915 can be secured within the outer tube 905 via protrusions formed on the inner surface of the outer tube 905. In some embodiments, the inner tubes 910 and 915 can be joined via a magnetic coupling or a retainer ring that can encircle overlapping portions of the inner tubes 910 and 915. In some embodiments, the inner tube(s) 910 and 915 can be formed from a flat sheet of stock material that is rolled into a tube shape. In such an embodiment, the corrugation features can be formed on a surface of the flat sheet of stock material and the corrugation features can include helical corrugations, as well as non-helical corrugations formed as ridges and valleys on the surface of the flat sheet of stock material. In some embodiments, the inner tube(s) 910 and 915 can be formed via additive manufacturing methods.

The helical-shaped groove 920 can be formed as a continuous or semi-continuous groove that can extend along a length of the inner tube(s) 910 and 915. The helical-shaped groove 920 can form a waveguide configured to transmit electromagnetic waves through the MCG 900. For example, the helical-shaped groove 920 can be configured to propagate a millimeter electromagnetic wave in one or more transmission modes. In some embodiments, the helical-shaped groove 920 can be configured to propagate the millimeter electromagnetic wave in an HE11 transmission mode, although other transmission modes can be propagated via the helical-shaped groove 920, such as transverse electric mode (TE) or transverse magnetic mode (TM) or combination of TE & TM.

As further shown in FIG. 9, in some embodiments, a gap 925 can be defined between the outer surface of the inner tube(s) 910 and 915 and the inner surface of the outer tube 905. The gap 925 can enable the inner tube(s) 910 and 915 to expand within the tube 905 as a result of thermal expansion of the inner tubes 910 and 915 during electromagnetic wave transmission through MCG 900. The gap 925 can also allow gas to pass from the surface to the bottom of the borehole.

As further shown in FIG. 9, in some embodiments, the helical-shaped groove 920 can include a conductive material 930. The conductive material 930 can be on the surface of the helical groove 920. In some embodiments, the inner surface of the inner tube(s) 910 and/or 915 can include a conductive material 935. The conductive material can include copper, silver, platinum, or gold.

In some embodiments, the MCG 900 can include an inner diameter 940 measured between protruding portions of each inner tube 910 and 915. The protruding portions can be formed by the helical-shaped groove 920. In some embodiments, the inner diameter 940 can include a diameter of 5.0 mm-15.0 mm, 10.0 mm-20.0 mm, 15.0 mm-25.0 mm, 20.0 mm-30.0 mm, 25.0 mm-35.0 mm, 30.0 mm-40.0 mm, 45.0 mm-55.0 mm, 50.0 mm-60.0 mm, 55.0 mm-65.0 mm, 60.0 mm-70.0 mm, 65.0 mm-75.0 mm, 70.0 mm-80.0 mm, 75.0 mm 90.0 mm, or 85.0 mm-200.0 mm. In some embodiments, the diameter can be greater than 200.0 mm or less than 5.0 mm. Other diameters are possible. In some embodiments, the inner diameter 940 can include a tolerance range, such as +/−0.075 mm, +/−0.1 mm, +/−0.125 mm, +/−0.150 mm, +/−0.175 mm, +/−0.2 mm, +/−0.225 mm, or +/−0.25 mm, although other tolerance ranges are possible.

Figure 10:
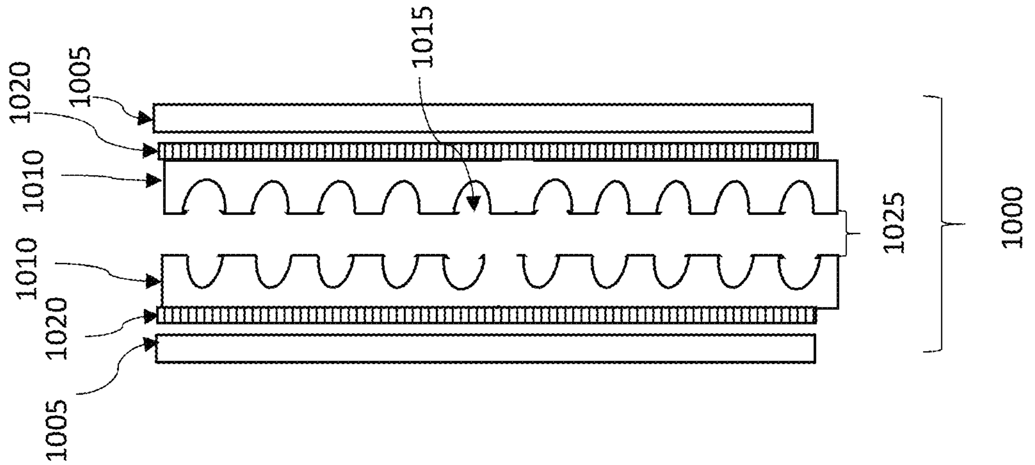
FIG. 10 is a diagram illustrating a cross-sectional view of an exemplary embodiment of a multi-piece corrugated waveguide including an inner tube having a helical groove and a dielectric material on an outer surface of an inner tube of a multi-piece corrugated waveguide as described herein.

FIG. 10 is a diagram illustrating an exemplary embodiment of a multi-piece corrugated waveguide 1000 including an inner tube having a helical groove and a dielectric material on an outer surface of an inner tube of a multi-piece corrugated waveguide as described herein. As shown in FIG. 10, the MCG 1000 can include an outer tube 1005, and an inner tube 1010. In the embodiment, shown in FIG. 10 a single inner tube 1010 is configured inside the outer tube 1005. The inner tube 1010 includes a helical-shaped groove 1015 formed on an inner surface of the inner tube 1010. The helical-shaped groove 1015 can be a continuous groove formed along the length of the inner tube 1010 and can form a waveguide. The MCG 1000 can include a dielectric material 1020 on the outer surface of the inner tube 1010. The dielectric material 1020 can include glass, ceramics, porcelain or plastics and can be applied to the outer diameter of the inner tube 1020 as a coating or the dielectric material 1020 can be a standalone component that is added to the MCG 1000 assembly. The dielectric material 1020 can electrically isolate the outer tube 1005 from the inner tube 1010 and can prevent electrical shorting between them.

In some embodiments, the MCG 1000 can include an inner diameter 1025 measured between protruding portions of the inner tube 1010. The protruding portions can be formed by the helical-shaped groove 1015. In some embodiments, the inner diameter 1025 can include a diameter of 5.0 mm-15.0 mm, 10.0 mm-20.0 mm, 15.0 mm-25.0 mm, 20.0 mm-30.0 mm, 25.0 mm-35.0 mm, 30.0 mm-40.0 mm, 45.0 mm-55.0 mm, 50.0 mm-60.0 mm, 55.0 mm-65.0 mm, 60.0 mm-70.0 mm, 65.0 mm-75.0 mm, 70.0 mm-80.0 mm, 75.0 mm-90.0 mm, or 85.0 mm-200.0 mm. In some embodiments, the diameter can be greater than 200.0 mm or less than 5.0 mm. Other diameters are possible. In some embodiments, the inner diameter 1025 can include a tolerance range, such as +/−0.075 mm, +/−0.1 mm, +/−0.125 mm, +/−0.150 mm, +/−0.175 mm, +/−0.2 mm, +/−0.225 mm, or +/−0.25 mm, although other tolerance ranges are possible.

Figure 11:
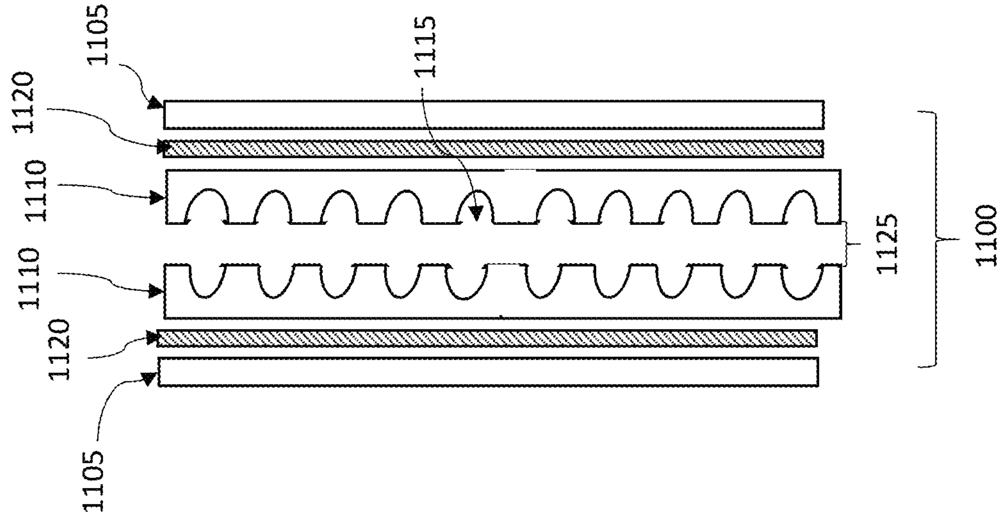
FIG. 11 is a diagram illustrating a cross-sectional view of an exemplary embodiment of a multi-piece corrugated waveguide including an inner tube having a helical groove and an insulative layer between a tube and a coil spring of a multi-piece corrugated waveguide as described herein.

FIG. 11 is a diagram illustrating a cross-sectional view of an exemplary embodiment of a multi-piece corrugated waveguide 1100 including an inner tube having a helical groove and an insulative layer between a tube and a coil spring of a multi-piece corrugated waveguide as described herein. As shown in FIG. 11, the MCG 1100 can include an outer tube 1105, an inner tube 1110, and a helical-shaped grooved 1115 formed on an inner surface of the inner tube 1110. The MCG 1100 can also include an insulative layer 1120. The insulative layer 1120 can be positioned between the outer tube 1105 and the inner tube 1110. In some embodiments, the insulative layer 1120 can be formed from an insulative material, such as fiberglass, open cell foam, closed cell foam, polystyrene, ceramic fiber, carbon composite, silica fiber, rockwool, or the like. Insulative material 1120 can be positioned in between the inner surface of the outer tube 1105 and the outer surface of the inner tube 1110 to separate the heat in a wellbore annulus 205 from the inner tube 1110. This can allow purge gas from the surface to cool the inner tube 1110 all the way down to the bottom of the borehole without losing cooling capability due to the interaction with the inner surface of the outer tube 1105 (which is in contact with hot gas rising up through the annulus 205).

In some embodiments, the MCG 1100 can include an inner diameter 1125 measured between protruding portions of the inner tube 1110. The protruding portions can be formed by the helical-shaped groove 1115. In some embodiments, the inner diameter 1125 can include a diameter of 5.0 mm-15.0 mm, 10.0 mm-20.0 mm, 15.0 mm-25.0 mm, 20.0 mm-30.0 mm, 25.0 mm-35.0 mm, 30.0 mm-40.0 mm, 45.0 mm-55.0 mm, 50.0 mm-60.0 mm, 55.0 mm-65.0 mm, 60.0 mm-70.0 mm, 65.0 mm-75.0 mm, 70.0 mm-80.0 mm, 75.0 mm-90.0 mm, or 85.0 mm-200.0 mm. In some embodiments, the diameter can be greater than 200.0 mm or less than 5.0 mm. Other diameters are possible. In some embodiments, the inner diameter 1125 can include a tolerance range, such as +/−0.075 mm, +/−0.1 mm, +/−0.125 mm, +/−0.150 mm, +/−0.175 mm, +/−0.2 mm, +/−0.225 mm, or +/−0.25 mm, although other tolerance ranges are possible.

Figure 12:
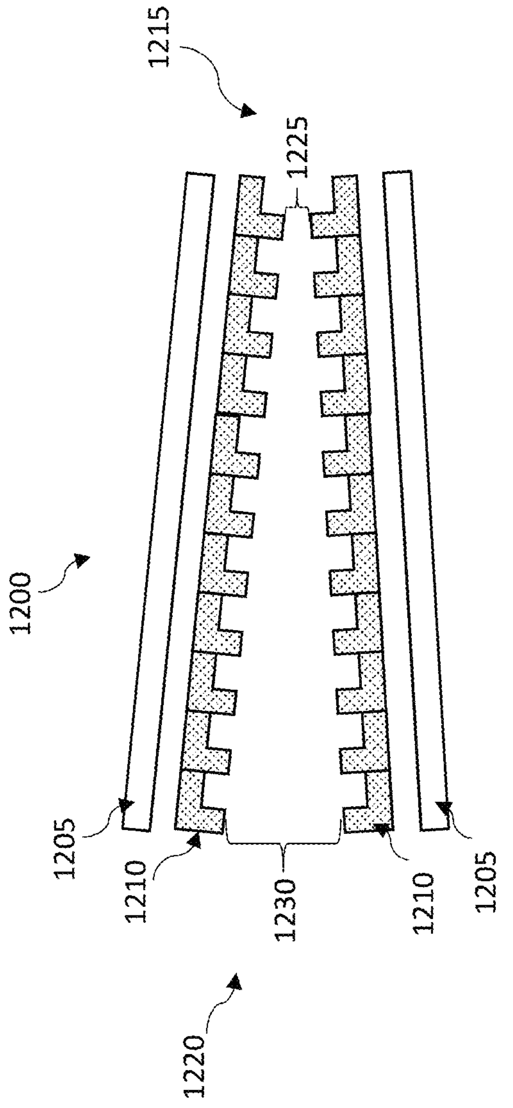
FIG. 12 is a diagram illustrating a cross-sectional view of an exemplary embodiment of a multi-piece corrugated waveguide including a tapered tube and a tapered coil spring as described herein.

FIG. 12 is a diagram illustrating a cross-sectional view of an exemplary embodiment of a multi-piece corrugated waveguide 1200 including a tapered tube and a tapered coil spring as described herein. As shown in FIG. 12, the MCG 1200 can include a tube 1205 and a coil spring 1210 within the tube 1205. The tube 1205 can be a tapered tube. The tapered tube 1205 can have a first diameter defined between opposing surfaces of the tube 1205 at a first end 1215 of the MCG 1200 and a second diameter defined between opposing surfaces of the tube 1205 at a second end 1220 of the MCG 1200. The diameter of the tube 1205 can thus vary from the first end 1215 to the second end 1220. For example, the first diameter of the tube 1205 at the first end 1215 can be smaller than the second diameter of the tube 1205 at the second end 1220. As further shown in FIG. 12, the coil spring 1210 can be a tapered coil spring. Similarly to the tube 1205, the coil spring 1210 can have a diameter that changes from the first end 1215 to the second end 1220. The tapered coil spring 1210 can be formed using a tapered mandrel as described in relation to FIG. 3. The two-piece design can advantageously reduce the machining difficulty of making tapered corrugation features within a tapered tube 1205.

In some embodiments, the MCG 1200 can include an inner diameter 1225 measured between protruding portions of the inner tube 1210 at the first end 1215 of the MCG 1200. In some embodiments, the inner diameter 1225 can include a diameter of 5.0 mm-15.0 mm, 10.0 mm-20.0 mm, 15.0 mm-25.0 mm, 20.0 mm-30.0 mm, 25.0 mm-35.0 mm, 30.0 mm-40.0 mm, 45.0 mm-55.0 mm, 50.0 mm-60.0 mm, 55.0 mm-65.0 mm, 60.0 mm-70.0 mm, 65.0 mm-75.0 mm, 70.0 mm-80.0 mm, 75.0 mm-90.0 mm, or 85.0 mm-200.0 mm. In some embodiments, the diameter can be greater than 200.0 mm or less than 5.0 mm. Other diameters are possible. In some embodiments, the inner diameter 1225 can include a tolerance range, such as +/−0.075 mm, +/−0.1 mm, +/−0.125 mm, +/−0.150 mm, +/−0.175 mm, +/−0.2 mm, +/−0.225 mm, or +/−0.25 mm, although other tolerance ranges are possible.

In some embodiments, the MCG 1200 can include an inner diameter 1230 measured between protruding portions of the inner tube 1210 at the second end 1230 of the MCG 1200. In some embodiments, the inner diameter 1230 can include a diameter of 5.0 mm-15.0 mm, 10.0 mm-20.0 mm, 15.0 mm-25.0 mm, 20.0 mm-30.0 mm, 25.0 mm-35.0 mm, 30.0 mm-40.0 mm, 45.0 mm-55.0 mm, 50.0 mm-60.0 mm, 55.0 mm-65.0 mm, 60.0 mm-70.0 mm, 65.0 mm-75.0 mm, 70.0 mm-80.0 mm, 75.0 mm-90.0 mm, or 85.0 mm-200.0 mm. In some embodiments, the diameter can be greater than 200.0 mm or less than 5.0 mm. Other diameters are possible. In some embodiments, the inner diameter 1230 can include a tolerance range, such as +/−0.075 mm, +/−0.1 mm, +/−0.125 mm, +/−0.150 mm, +/−0.175 mm, +/−0.2 mm, +/−0.225 mm, or +/−0.25 mm, although other tolerance ranges are possible.

Figure 13:
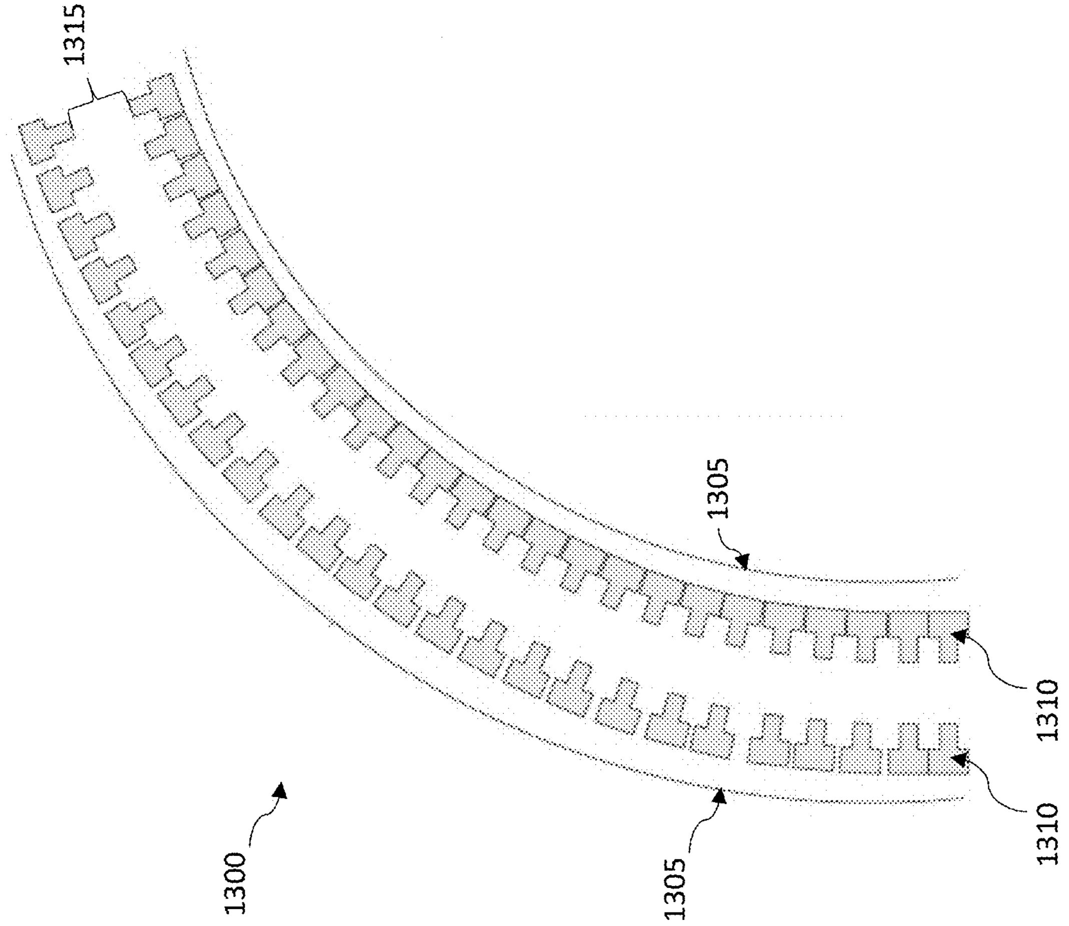
FIG. 13 is a diagram illustrating a cross-sectional view of an exemplary embodiment of a multi-piece corrugated waveguide including a bent tube as described herein.

FIG. 13 is a diagram illustrating a cross-sectional view of an exemplary embodiment of a multi-piece corrugated waveguide 1300 including a bent tube as described herein. As shown in FIG. 13, the MCG 1300 can include a tube 1305 (of which only the inner surface is shown for clarity) and a coil spring 1310 within the tube 1305. The bent tube 1305 can enable the MCG 1300 to be deployed in a variety of borehole configurations which are not mostly vertical or mostly horizontal geometries. For example, MCG 1300 can be utilized in transitions between vertical borehole configurations and horizontal borehole configurations, or vice versa. MCG 1300 can be deployed to maneuver or otherwise steer electromagnetic waves around subsurface obstacles or geologic formations which may otherwise limit the transmission efficiency of the transmitted electromagnetic waves. In some embodiments, the tube 1305 can be a bellowed tube including a plurality of collapsible segments configured to form a bend in the tube 1305.

In some embodiments, the coil spring 1310 can include an inner diameter 1315 measured between protruding portions of each coil element of the coil spring 1310. In some embodiments, the inner diameter 1315 can include a diameter of 5.0 mm-15.0 mm, 10.0 mm-20.0 mm, 15.0 mm-25.0 mm, 20.0 mm-30.0 mm, 25.0 mm-35.0 mm, 30.0 mm-40.0 mm, 45.0 mm-55.0 mm, 50.0 mm-60.0 mm, 55.0 mm-65.0 mm, 60.0 mm-70.0 mm, 65.0 mm-75.0 mm, 70.0 mm-80.0 mm, 75.0 mm-90.0 mm, or 85.0 mm-200.0 mm. In some embodiments, the diameter can be greater than 200.0 mm or less than 5.0 mm. Other diameters are possible. In some embodiments, the inner diameter 1315 can include a tolerance range, such as +/−0.075 mm, +/−0.1 mm, +/−0.125 mm, +/−0.150 mm, +/−0.175 mm, +/−0.2 mm, +/−0.225 mm, or +/−0.25 mm, although other tolerance ranges are possible.

Figure 14B:
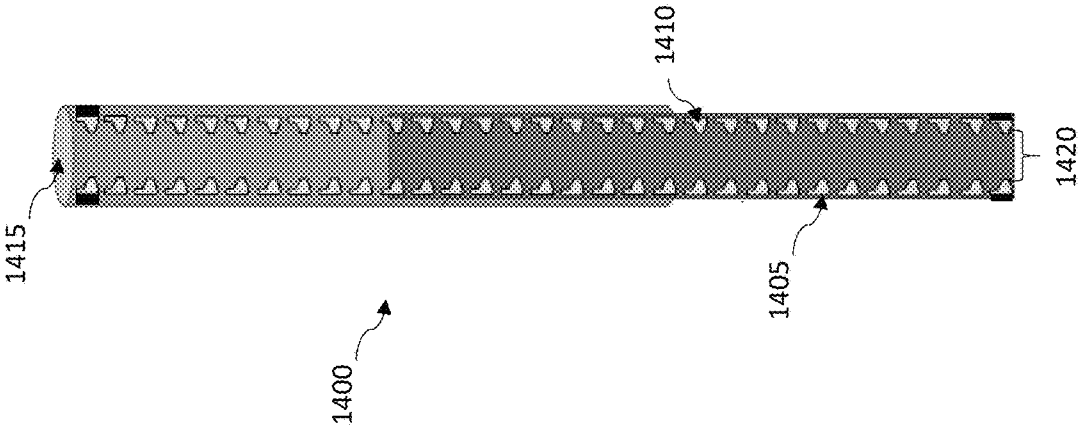
FIGS. 14A-14B are diagrams illustrating cross-sectional views of exemplary embodiments of a multi-piece corrugated waveguide including a casing from which the tube and coil spring can extend as described herein.
Figure 14A:
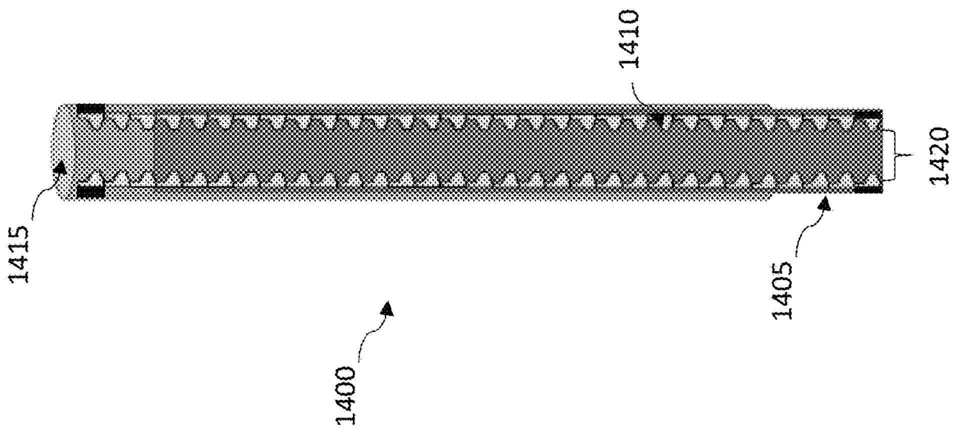

FIGS. 14A-14B are diagrams illustrating cross-sectional views of exemplary embodiments of a multi-piece corrugated waveguide 1400 including a casing from which the tube and coil spring can extend as described herein. The MCG 1400 can include a tube 1405, a coil spring 1410 within the tube 1405, and a casing 1415. As shown in FIG. 14A, the MCG 1400 is shown in a retracted position. The tube 1405 and the coil spring 1410 are retracted within the casing 1415. In FIG. 14B, the MCG 1400 is shown in an extended position. In FIG. 14B, the tube 1405 and the coil spring 1410 have been extended from within the casing 1415. In this way, the tube 1405 and coil spring 1410 can telescopically retract into and extend from the casing 1415. By having the coiled spring 1410 span the length of the casing 1415 and the tube 1505, the millimeter wave can be contained regardless of what position or angle of flexion the MCG 1400 is in. And since the spring 1405 is one piece, there is no step change between the inner diameter of the casing 1415 and inner diameter of the tube 1405. This can eliminates loss of power of millimeter wave that can be associated with abrupt diameter changes.

In some embodiments, the coil spring 1410 can include an inner diameter 1420 measured between protruding portions of each coil element of the coil spring 1410. In some embodiments, the inner diameter 1420 can include a diameter of 5.0 mm-15.0 mm, 10.0 mm-20.0 mm, 15.0 mm-25.0 mm, 20.0 mm-30.0 mm, 25.0 mm-35.0 mm, 30.0 mm-40.0 mm, 45.0 mm-55.0 mm, 50.0 mm-60.0 mm, 55.0 mm-65.0 mm, 60.0 mm-70.0 mm, 65.0 mm-75.0 mm, 70.0 mm-80.0 mm, 75.0 mm-90.0 mm, or 85.0 mm-200.0 mm. In some embodiments, the diameter can be greater than 200.0 mm or less than 5.0 mm. Other diameters are possible. In some embodiments, the inner diameter 1420 can include a tolerance range, such as +/−0.075 mm, +/−0.1 mm, +/−0.125 mm, +/−0.150 mm, +/−0.175 mm, +/−0.2 mm, +/−0.225 mm, or +/−0.25 mm, although other tolerance ranges are possible.

Figure 15:
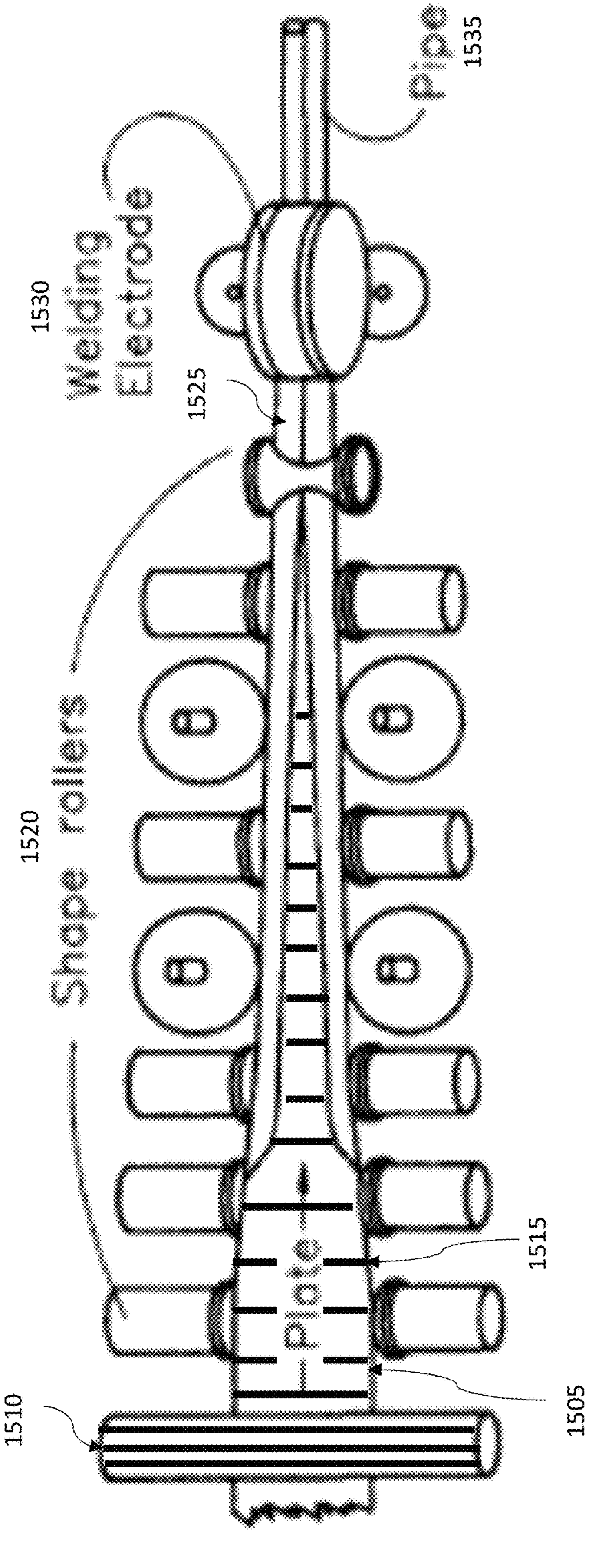
FIG. 15 is a diagram illustrating an exemplary embodiment of manufacturing of a coil tubing product for use in a multi-piece corrugated waveguide as described herein.

FIG. 15 is a diagram illustrating an exemplary embodiment of manufacturing of a coil tubing product for use in a multi-piece corrugated waveguide as described herein. In some embodiments, the multi-piece corrugated waveguide can be formed from a continuous tube, a coil tubing product, or a pipe tubing product. Continuous tubes and coil or pipe tubing products can be formed from long strips of sheet metal. The long strips of metal may be configured on a reel. The strips of metal can be welded together at the ends of the strips of metal and then can be rolled to form a tube via rollers. The tube can then be welded shut to form tubes of extremely long continuous lengths, such as tubes in excess of 10 km in length. In embodiments including a continuous tube, a coil tubing product, or a pipe tubing product the length of the tube can be greater than 10 km.

In some embodiments, corrugation features, such as ridges and/or grooves, can be rolled or stamped into the strips of sheet metal. In this way, when the coil tube is formed from the strips of sheet metal, the corrugation features are provided on an inner surface of the coil tube. In this way, a first tube can be formed to include corrugation features preconfigured on an inner surface of the first tube. The first tube can then be inserted into a second tube to form a multi-piece corrugated waveguide as described in embodiments herein.

As shown in FIG. 15, a long strip of stock metal 1505 can be brought into contact with a roller 1510. The roller 1510 can include grooves and ridges, which can form corrugation features 1515 in the strip of metal. The corrugation features 1515 can be formed on a surface of the metal stock 1505 which can correspond to an inner surface of a tube to be formed. The metal stock 1505 can be conveyed through one or more shape roller 1520 to transform the metal stock 1505 into a tube 1525. The tube 1525 can have an open seam at which opposing edges of the metal stock 1505 are in proximity to each other. The seam can be welded via a welding device 1530 to form a fully enclosed tube or pipe 1535 including the corrugation features 1515 within.

Figure 16:
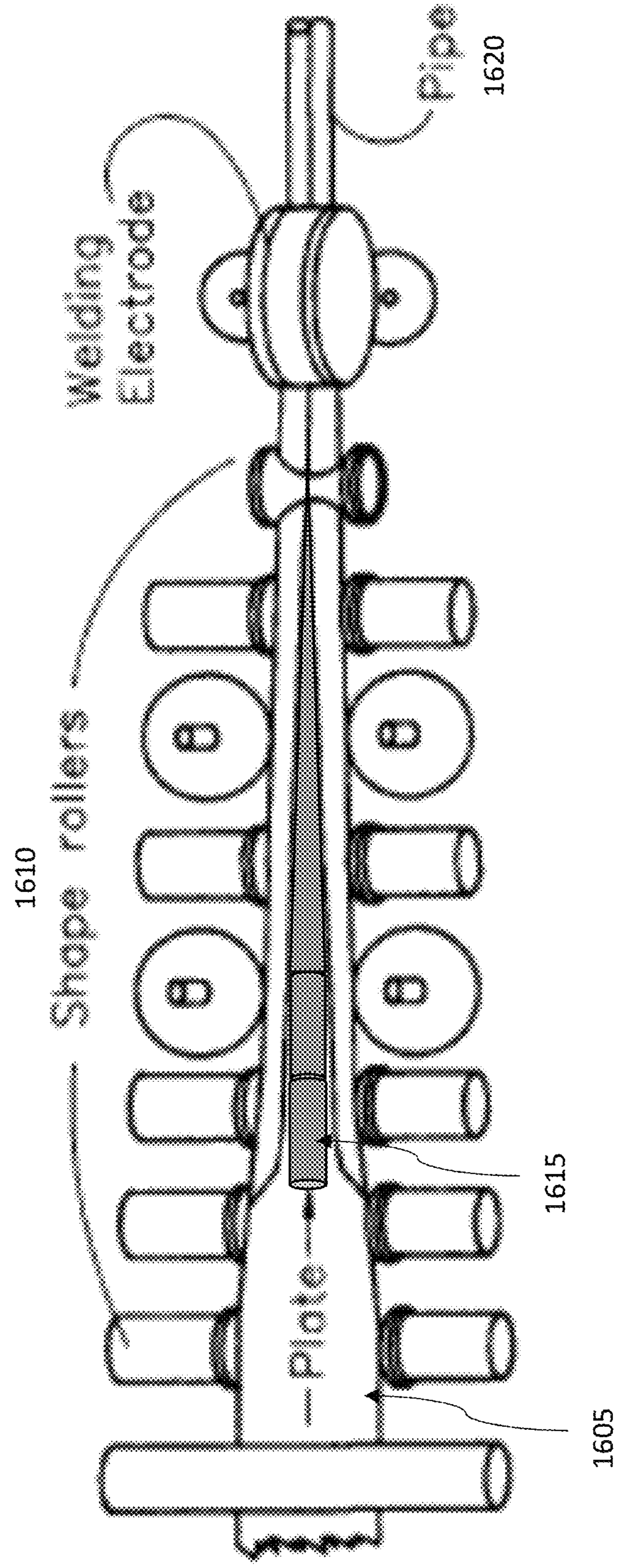
FIG. 16 is a diagram illustrating an exemplary embodiment of manufacturing a multi-piece corrugated waveguide as described herein including a coil tubing product.

FIG. 16 is a diagram illustrating an exemplary embodiment of manufacturing a multi-piece corrugated waveguide as described herein including a coil tubing product. For example, a long strip of metal stock 1605 can be received in one or more shape rollers 1610. A coil spring 1615 or a previously formed coil tubing product 1615 can be inserted into a portion of the metal stock 1605 as the metal stock is being formed by the shape rollers 1610. In some embodiments, the coil tubing product 1615 can be formed as described in relation to FIG. 15. Once inserted, the metal stock 1605 can be fully formed into a tube and welded shut. The resulting tube 1620 can include the coil spring 1615 or the coil tubing product 1615 therein, which can provide corrugation features described herein. In some embodiments, the coil spring or the coil tubing product 1605 can be inserted before the tube is fully enclosed and welded shut. In some embodiments, the coil spring or the coil tubing product 1615 can be inserted into the coil tube as the tube is being formed and welded shut.

FIGS. 17A-17G are diagrams illustrating exemplary embodiments of coil springs included in a multi-piece corrugated waveguide as described herein. The coil springs shown in FIGS. 17A-17G can correspond to the coil springs described in the embodiments herein and can include embodiments of coil springs configured as compression springs or extension springs. In some embodiments, a combination of compression coil springs and extension coil springs can be used within a tube as described herein.

As shown in FIG. 17A, an embodiment of a compression coil spring is shown having a length 1705. The coil spring can include an inner diameter 1710 and a width 1715. In some embodiments, the inner diameter 1710 can include a diameter of 5.0 mm-15.0 mm, 10.0 mm-20.0 mm, 15.0 mm-25.0 mm, 20.0 mm-30.0 mm, 25.0 mm-35.0 mm, 30.0 mm-40.0 mm, 45.0 mm-55.0 mm, 50.0 mm-60.0 mm, 55.0 mm-65.0 mm, 60.0 mm-70.0 mm, 65.0 mm-75.0 mm, 70.0 mm-80.0 mm, 75.0 mm-90.0 mm, or 85.0 mm-200.0 mm. In some embodiments, the diameter can be greater than 200.0 mm or less than 5.0 mm. Other diameters are possible. In some embodiments, the inner diameter 1710 can include a tolerance range, such as +/−0.075 mm, +/−0.1 mm, +/−0.125 mm, +/−0.150 mm, +/−0.175 mm, +/−0.2 mm, +/−0.225 mm, or +/−0.25 mm, although other tolerance ranges are possible.

In some embodiments, the width 1715 can be dimensioned to be less than a wavelength of an electromagnetic wave provided through the MCG described herein. For example, the width 1715 can be less than a wavelength of a millimeter electromagnetic wave injected into the borehole of a well. In some embodiments, the width 1715 can be ⅓ to ¼ of the frequency of the RF signal being transmitted the MCG described herein. The width 1715 of the coil can correspond to the pitch of the spring and the corrugation features formed within the MCG described herein.

A coil element 1720 of the coil spring can be defined as a complete turn, e.g., 360 degrees, of the coil spring as measured along a circumference of the coil spring. A plurality of coil elements 1720 can form the coil spring to have a length 1705. The coil spring can include a space 1725 between two or more coil elements 1720. For example, the space 1725 can be larger than the frequency of the electromagnetic wave injected into the MCG described herein, but the spring can be configured to compress so that the space 1725 is reduced to at least ⅒ of the frequency of the of the injected electromagnetic wave to prevent it from leaking through. In some embodiments, the space 1715 can be 0.1-0.2 mm, 0.15-0.25 mm, 0.3-0.4 mm, 0.35-0.45 mm, or 0.5-0.6 mm. In some embodiments, the space can be greater than 0.6 mm or less than 0.1 mm. Other space sizes can be included.

In some embodiments, the coil spring and the plurality of coil elements 1720 can include a pitch 1730 between coil elements 1720. The pitch can be measured from a center point of a first coil element to a center point of a second coil element that is adjacent to the first coil element. In some embodiments, the pitch 1730 can be dimensioned to be a ⅓ of a wavelength of an electromagnetic wave provided through the MCG described herein. For example, the pitch 1730 can be a ⅓ of a wavelength of a millimeter electromagnetic wave injected into the borehole of a well. For example, the pitch can be 0.3 mm to 7.0 mm.

FIGS. 17B-17G illustrate additional, example embodiments of a coil spring for use with the MCG embodiments described herein. Any and all of the coil springs shown in FIGS. 17B-17G can have a coil spring diameter, a coil element width, a pitch between coil elements, and a space between coil elements as described in relation to the coil spring shown and described in FIG. 17A. For example, in FIG. 17B, an extension spring is shown. The extension spring can be coated with a material 1735, such as a conductive material. The spring can also be coated with a highly conductive metallic material, such as gold, platinum, copper or aluminum, which can optimize transmission efficiency. The extension spring can include a first coupling portion at a first end and a second coupling portion at a second end. As shown in FIG. 17C, a compression coil spring is shown. The compression spring can include a first coupling portion at a first end and a second coupling portion at a second end.

Figure 17D:
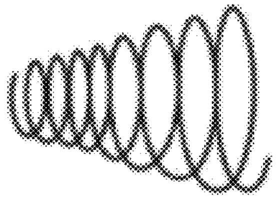
Figure 17E:
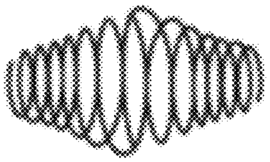

As shown in FIG. 17D, in some embodiments, the coil spring can include a tapered coil spring. The tapered coil spring can include a diameter that changes along a length of the coil spring. As shown in FIG. 17E, in some embodiments, the coil spring can include multiple tapered portions. In the embodiment shown in FIG. 17E, the coil spring can have an upper tapered portion and a lower tapered portion with a non-tapered portion between the upper tapered portion and the lower tapered portion.

Figure 17F:
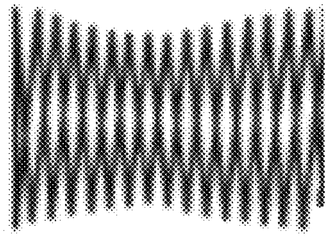
Figure 17G:
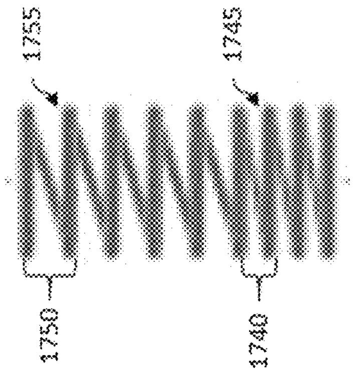

As shown in FIG. 17F, in some embodiments, the coil spring can include tapered portions that have a larger diameter than a non-tapered portion between the upper and lower tapered portions. As shown in FIG. 17G, in some embodiments, the coil spring can include multiple pitch configurations between coil elements at two or more locations along the length of the coil spring. For example, the coil spring can include a first pitch 1740 and a second pitch 1750. The first pitch 1740 can be smaller than the second pitch 1750. In some embodiments, the first pitch can be larger than the second pitch. Similarly, in some embodiments, the coil spring can have a first space 1745 between a first plurality of coil elements and a second space 1755 between a second plurality of coil elements.

Figure 18A:
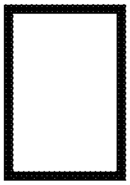
FIGS. 18A-18E are diagrams illustrating exemplary embodiments a cross-sectional shape of a plurality of coil elements included in a multi-piece guide as described herein.
Figure 18B:
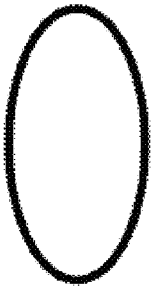
Figure 18C:
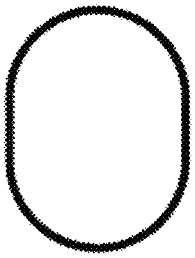
Figure 18D:
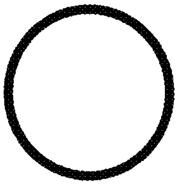
Figure 18E:
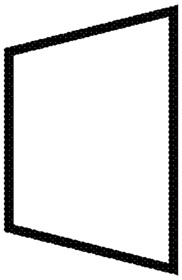

FIGS. 18A-18E are diagrams illustrating exemplary embodiments a cross-sectional shape of a plurality of coil elements included in a multi-piece guide as described herein. The cross-sectional shapes of the plurality of coil elements included in the coil springs described herein can be formed according to operation 310 of FIG. 3. As shown in FIG. 18A, in some embodiments, the plurality of coil elements can include a rectangular cross-sectional shape. In some embodiments, the plurality of coil elements can include an elliptical cross-sectional shape as shown in FIG. 18B. As shown in FIG. 18C, in some embodiments, the plurality of coil elements can include an oval cross-sectional shape. As shown in FIG. 18D, in some embodiments, the plurality of coil elements can include a circular cross-sectional shape. As shown in FIG. 18E, in some embodiments, the plurality of coil elements can include a trapezoidal cross-sectional shape. In some embodiments, the plurality of coil elements can include a square shape, a triangular shape, or a polygonal shape. Although the cross-sectional shapes shown in FIGS. 18A-18E are described in the context of cross-sectional shapes of pluralities of coil elements, the cross-sectional shapes shown in FIGS. 18A-18E can also correspond to cross-sectional shapes of mandrels used to form the pluralities of coil elements.

FIGS. 19A-25B illustrate various embodiments of cross-sectional profiles of coil elements. The cross-sectional profiles can be formed as described in operation 305 of FIG. 3. A wire forming the coil spring and the coil elements of the coil spring can be extruded to have a cross-sectional profile shown in FIGS. 19A-25B. A variety of cross-sectional profiles can be formed in this way and can be configured for use in the various MCG embodiments described herein. For example, in some embodiments, the cross-sectional profile can include a triangular or pointed cross-sectional profile in addition to those shown in FIGS. 19A-25B. Other cross-sectional profiles are possible.

Figure 19B:
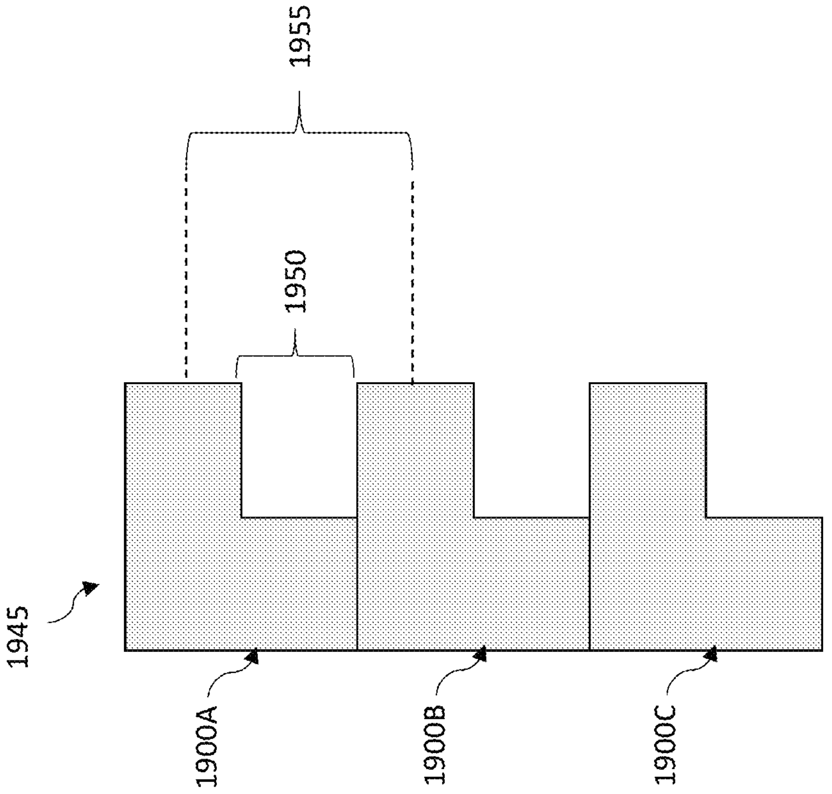
FIG. 19B is a diagram illustrating an exemplary embodiment of a plurality of coil elements, each coil element including a square cross-sectional profile of a protruding portion as described herein.
Figure 19A:
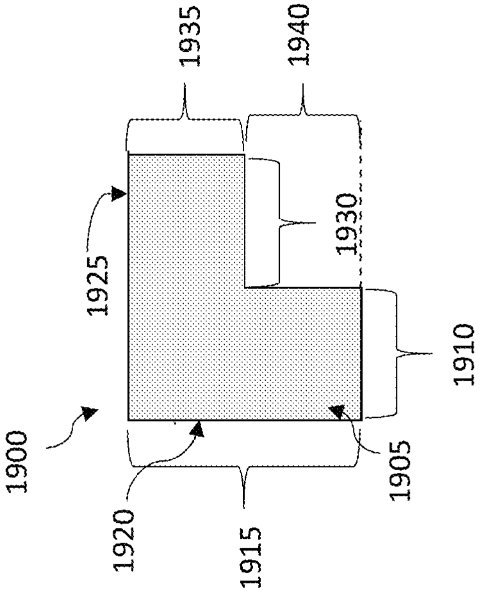
FIG. 19A is a diagram illustrating an exemplary embodiment of a square cross-sectional profile of a protruding portion of a coil element of a multi-piece corrugated waveguide as described herein.

FIG. 19A is a diagram illustrating an exemplary embodiment of a square cross-sectional profile of a protruding portion of a coil element of a multi-piece corrugated waveguide as described herein. As shown in FIG. 19A, a coil element 1900 can include a base portion 1905 and a protruding portion 1925 extending from the base portion 1905. The base portion 1905 can include a height 1910, a width 1915, and a back surface 1920. Although the base portion 1905 is shown with a rectangular-shaped profile, additional base portion profile shapes can be implemented. Similarly, although the back surface 1920 is shown as a flat-shaped back surface, additional back surface shapes or profiles can be implemented. In some embodiments, the height 1910 can include a height of 0.2 mm-0.4 mm, 0.3 mm-0.5 mm, 0.4 mm-0.6 mm, 0.5 mm-0.7 mm, 0.6 mm-1.0 mm, 2.0 mm-5.0 mm, 4 mm-8 mm, 6 mm-10 mm, or 12 mm-15 mm. In some embodiments, the height can be greater than 15 mm or less than 0.2 mm. Other heights are possible.

As shown in FIG. 19A, the coil element 1900 can include a protruding portion 1925 extending from the base portion 1905. The protruding portion 1925 can include a square-shaped profile as shown in FIG. 19A, although other profile shapes can be implemented. The protruding portion 1925 can include a height 1930, a width 1935 and an offset 1940. In some embodiments, the height 1930 can include a height of 0.2 mm-0.4 mm, 0.3 mm-0.5 mm, 0.4 mm-0.6 mm, 0.5 mm-0.7 mm, or 0.6 mm-1.0 mm. In some embodiments, the height can be greater than 1.0 mm or less than 0.2 mm. Other heights are possible. In some embodiments, the height 1930 can include a tolerance range, such as +/−0.010 mm, +/−0.020 mm, +/−0.030 mm, +/−0.040 mm, or +/−0.050 mm, although other tolerance ranges are possible.

In some embodiments, the width 1935 can include a width of 0.2 mm-0.4 mm, 0.3 mm-0.5 mm, 0.4 mm-0.6 mm, 0.5 mm-0.7 mm, 0.6 mm-0.8 mm, 0.7 mm-0.9, or 0.8 mm-1.0 mm. In some embodiments, the width can be greater than 1.0 mm or less than 0.2 mm. Other widths are possible. In some embodiments, the width 1935 can include a tolerance range, such as +/−0.050 mm, +/−0.060 mm, +/−0.070 mm, +/−0.080 mm, or +/−0.090 mm, although other tolerance ranges are possible.

In some embodiments, the offset 1940 can include an offset of 0.2 mm-0.4 mm, 0.3 mm-0.5 mm, 0.4 mm-0.6 mm, 0.5 mm-0.7 mm, 0.6 mm-0.8 mm, 0.7 mm-0.9, or 0.8 mm-1.0 mm. In some embodiments, the offset can be greater than 1.0 mm or less than 0.2 mm. Other offsets are possible.

In some embodiments, the offset 1940 can include a tolerance range, such as +/−0.050 mm, +/−0.060 mm, +/−0.070 mm, +/−0.080 mm, or +/−0.090 mm, although other tolerance ranges are possible.

FIG. 19B is a diagram illustrating an exemplary embodiment of a plurality of coil elements, each coil element including a square cross-sectional profile of a protruding portion as described herein. As shown in FIG. 19B, a plurality of coil elements 1945 can be formed such that each coil element (e.g., coil elements 1900A-1900C) has the same cross-sectional profile and dimensions as described in relation to the coil element shown in FIG. 19A. The plurality of coil elements 1945 can include a space 1950 between adjacent protruding portions 1925 of adjacent coil elements. In some embodiments the space 1950 can be dimensioned to be a ¼ of a wavelength of an electromagnetic wave provided through the MCG described herein. For example, the space 1950 can be a ⅙ of a wavelength of a millimeter electromagnetic wave injected into the borehole of a well. As further shown in FIG. 19B, the plurality of coil elements 1945 can include a pitch 1955. The pitch 1955 can be dimensioned to be a ⅓ of a wavelength of an electromagnetic wave provided through the MCG described herein. For example, the pitch 1955 can be a ⅓ of a wavelength of a millimeter electromagnetic wave injected into the borehole of a well. Other dimensions can be implemented as well.

Figure 20B:
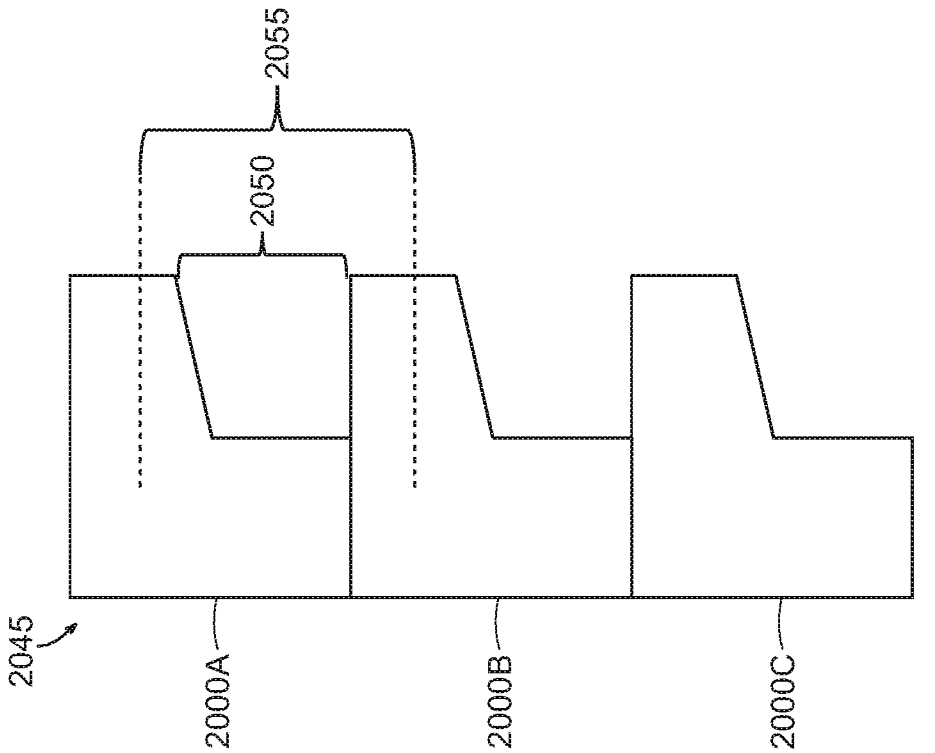
FIG. 20B is a diagram illustrating an exemplary embodiment of a plurality of coil elements, each coil element including a trapezoidal cross-sectional profile of a protruding portion as described herein.
Figure 20A:
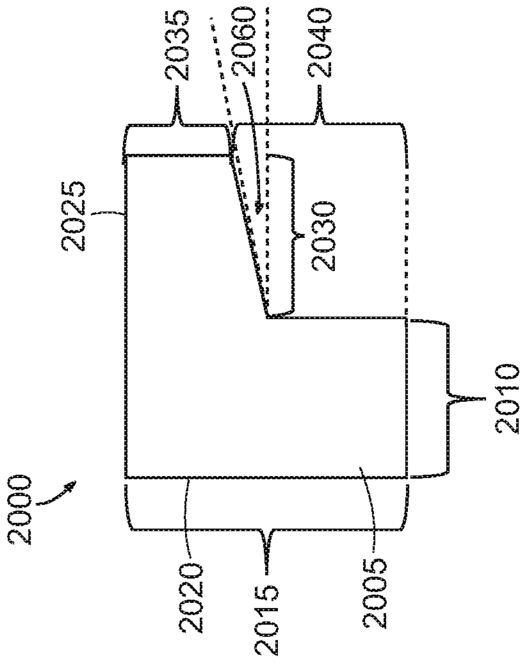
FIG. 20A is a diagram illustrating an exemplary embodiment of a trapezoidal cross-sectional profile of a protruding portion of a coil element of a multi-piece corrugated waveguide as described herein.

FIG. 20A is a diagram illustrating an exemplary embodiment of a trapezoidal cross-sectional profile of a protruding portion of a coil element of a multi-piece corrugated waveguide as described herein. As shown in FIG. 20A, a coil element 2000 can include a base portion 2005 and a protruding portion 2025 extending from the base portion 2005. The base portion 2005 can include a height 2010, a width 2015, and a back surface 2020. Although the base portion 2005 is shown with a rectangular-shaped profile, additional base portion profile shapes can be implemented. Similarly, although the back surface 2020 is shown as a flat-shaped back surface, additional back surface shapes or profiles can be implemented. In some embodiments, the height 2010 can include a height of 0.2 mm-0.4 mm, 0.3 mm-0.5 mm, 0.4 mm-0.6 mm, 0.5 mm-0.7 mm, 0.6 mm-1.0 mm, 2.0 mm-5.0 mm, 4 mm-8 mm, 6 mm-10 mm, or 12 mm-15 mm. In some embodiments, the height can be greater than 15 mm or less than 0.2 mm. Other heights are possible.

As shown in FIG. 20A, the coil element 2000 can include a protruding portion 2025 extending from the base portion 2005. The protruding portion 2025 can include a trapezoidal-shaped profile as shown in FIG. 20A, although other profile shapes can be implemented. The protruding portion 2025 can include a height 2030, a width 2035 and an offset 2040. In some embodiments, the height 2030 can include a height of 0.2 mm-0.4 mm, 0.3 mm-0.5 mm, 0.4 mm-0.6 mm, 0.5 mm-0.7 mm, or 0.6 mm-1.0 mm. In some embodiments, the height can be greater than 1.0 mm or less than 0.2 mm. Other heights are possible. In some embodiments, the height 2030 can include a tolerance range, such as +/−0.010 mm, +/−0.020 mm, +/−0.030 mm, +/−0.040 mm, or +/−0.050 mm, although other tolerance ranges are possible.

In some embodiments, the width 2035 can include a width of 0.2 mm-0.4 mm, 0.3 mm-0.5 mm, 0.4 mm-0.6 mm, 0.5 mm-0.7 mm, 0.6 mm-0.8 mm, 0.7 mm-0.9, or 0.8 mm-1.0 mm. In some embodiments, the width can be greater than 1.0 mm or less than 0.2 mm. Other widths are possible. In some embodiments, the width 2035 can include a tolerance range, such as +/−0.010 mm, +/−0.020 mm, +/−0.030 mm, +/−0.040 mm, or +/−0.050 mm, although other tolerance ranges are possible.

In some embodiments, the offset 2040 can include an offset of 0.2 mm-0.4 mm, 0.3 mm-0.5 mm, 0.4 mm-0.6 mm, 0.5 mm-0.7 mm, 0.6 mm-0.8 mm, 0.7 mm-0.9, or 0.8 mm-1.0 mm. In some embodiments, the offset can be greater than 1.0 mm or less than 0.2 mm. Other offsets are possible. In some embodiments, the offset 2040 can include a tolerance range, such as +/−0.010 mm, +/−0.020 mm, +/−0.030 mm, +/−0.040 mm, or +/−0.050 mm, although other tolerance ranges are possible.

In some embodiments, the protruding portion 2025 can include an angle 2060 that is formed relative to a surface of the base portion 2005 from which the protruding portion 2025 extends. In some embodiments, the angle 2060 can be 0-3.0 degrees, 1.5-5.0 degrees, 4.0-6.0 degrees, 5.5-7.0 degrees, 6.0-8.0 degrees, 7.5-9.0 degrees, 8.0-10.0 degrees, 9.0-12.0 degrees, 11.0-13.0 degrees, or 12.0-15.0 degrees, although other angles are possible. In some embodiments, the angle can be greater than 15 degrees. Other angles are possible.

FIG. 20B is a diagram illustrating an exemplary embodiment of a plurality of coil elements, each coil element including a trapezoidal cross-sectional profile of a protruding portion as described herein. As shown in FIG. 20B, a plurality of coil elements 2045 can be formed such that each coil element (e.g., coil elements 2000A-2000C) has the same cross-sectional profile and dimensions as described in relation to the coil element shown in FIG. 20A. The plurality of coil elements 2045 can include a space 2050 between adjacent protruding portions 2025 of adjacent coil elements. In some embodiments the space 2050 can be dimensioned to be a ⅙ of a wavelength of an electromagnetic wave provided through the MCG described herein. For example, the space 2050 can be a ⅙ of a wavelength of a millimeter electromagnetic wave injected into the borehole of a well. As further shown in FIG. 20B, the plurality of coil elements 2045 can include a pitch 2055. The pitch 2055 can be dimensioned to be a ⅓ of a wavelength of an electromagnetic wave provided through the MCG described herein. For example, the pitch 2055 can be a ⅓ of a wavelength of a millimeter electromagnetic wave injected into the borehole of a well. Other dimensions can be implemented as well.

Figure 21B:
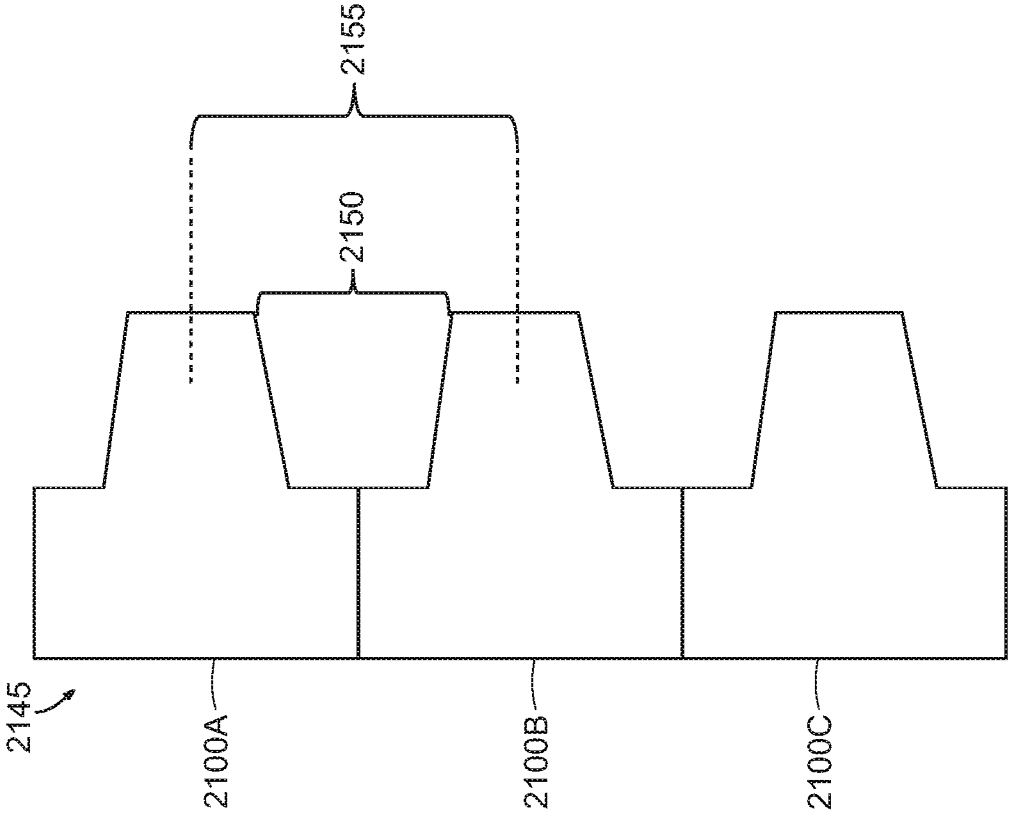
FIG. 21B is a diagram illustrating another exemplary embodiment of a plurality of coil elements, each coil element including a trapezoidal cross-sectional profile of a protruding portion as described herein.
Figure 21A:
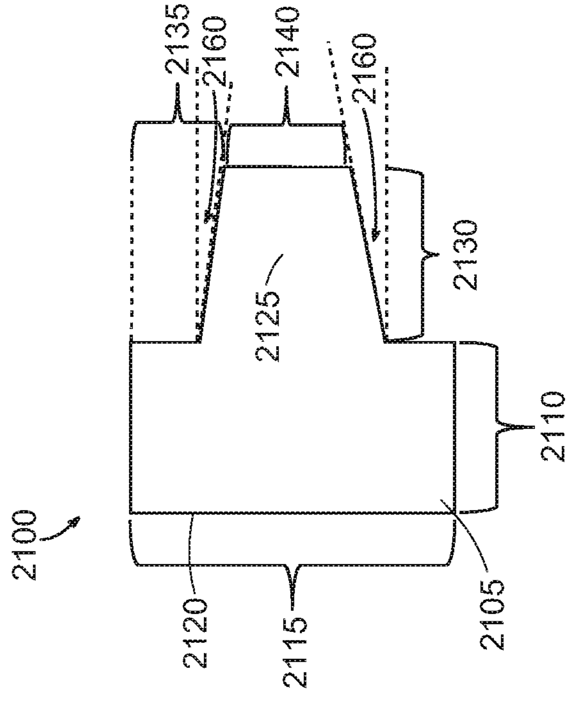
FIG. 21A is a diagram illustrating another exemplary embodiment of a trapezoidal cross-sectional profile of a protruding portion of a coil element of a multi-piece corrugated waveguide as described herein.

FIG. 21A is a diagram illustrating another exemplary embodiment of a trapezoidal cross-sectional profile of a protruding portion of a coil element of a multi-piece corrugated waveguide as described herein. As shown in FIG. 21A, a coil element 2100 can include a base portion 2105 and a protruding portion 2125 extending from the base portion 2105. The base portion 2105 can include a height 2110, a width 2115, and a back surface 2120. Although the base portion 2105 is shown with a rectangular-shaped profile, additional base portion profile shapes can be implemented. Similarly, although the back surface 2120 is shown as a flat-shaped back surface, additional back surface shapes or profiles can be implemented. In some embodiments, the height 2110 can include a height of 0.2 mm-0.4 mm, 0.3 mm-0.5 mm, 0.4 mm-0.6 mm, 0.5 mm-0.7 mm, 0.6 mm-1.0 mm, 2.0 mm-5.0 mm, 4 mm-8 mm, 6 mm-10 mm, or 12 mm-15 mm. In some embodiments, the height can be greater than 15 mm or less than 0.2 mm. Other heights are possible.

As shown in FIG. 21A, the coil element 2100 can include a protruding portion 2125 extending from the base portion 2105. The protruding portion 2125 can include a trapezoidal-shaped profile as shown in FIG. 21A, although other profile shapes can be implemented. The protruding portion 2125 can include a height 2130, an offset 2135, and a width 2140. In some embodiments, the offset 2135 can be the same or different on either side of the protruding portion 2125. In some embodiments, the height 2130 can include a height of 0.2 mm-0.4 mm, 0.3 mm-0.5 mm, 0.4 mm-0.6 mm, 0.5 mm-0.7 mm, or 0.6 mm-1.0 mm. In some embodiments, the height can be greater than 1.0 mm or less than 0.2 mm. Other heights are possible. In some embodiments, the height 2130 can include a tolerance range, such as +/−0.010 mm, +/−0.020 mm, +/−0.030 mm, +/−0.040 mm, or +/−0.050 mm, although other tolerance ranges are possible.

In some embodiments, the offset 2135 can include an offset of 0.2 mm-0.4 mm, 0.3 mm-0.5 mm, 0.4 mm-0.6 mm, 0.5 mm-0.7 mm, 0.6 mm-0.8 mm, 0.7 mm-0.9, or 0.8 mm-1.0 mm. In some embodiments, the offset can be greater than 1.0 mm or less than 0.2 mm. Other offsets are possible. In some embodiments, the offset 2135 can include a tolerance range, such as +/−0.010 mm, +/−0.020 mm, +/−0.030 mm, +/−0.040 mm, or +/−0.050 mm, although other tolerance ranges are possible.

In some embodiments, the width 2140 can include an width of 0.2 mm-0.4 mm, 0.3 mm-0.5 mm, 0.4 mm-0.6 mm, 0.5 mm-0.7 mm, 0.6 mm-0.8 mm, 0.7 mm-0.9, or 0.8 mm-1.0 mm. In some embodiments, the width can be greater than 1.0 mm or less than 0.2 mm. Other widths are possible. In some embodiments, the width 2140 can include a tolerance range, such as +/−0.010 mm, +/−0.020 mm, +/−0.030 mm, +/−0.040 mm, or +/−0.050 mm, although other tolerance ranges are possible.

In some embodiments, the protruding portion 2125 can include an angle 2160 that is formed relative to a surface of the base portion 2105 from which the protruding portion 2125 extends. In some embodiments, the angle 2160 can be 0-3.0 degrees, 1.5-5.0 degrees, 4.0-6.0 degrees, 5.5-7.0 degrees, 6.0-8.0 degrees, 7.5-9.0 degrees, 8.0-10.0 degrees, 9.0-12.0 degrees, 11.0-13.0 degrees, or 12.0-15.0 degrees, although other angles are possible. In some embodiments, the angle can be greater than 15 degrees. In some embodiments, the angle 2160 can be the same on either side of the protruding portion 2125. In some embodiments, the angle 2160 on one side of the protruding portion 2125 can be different than an angle 2160 on an opposite side of the protruding portion 2125.

FIG. 21B is a diagram illustrating another exemplary embodiment of a plurality of coil elements, each coil element including a trapezoidal cross-sectional profile of a protruding portion as described herein. As shown in FIG. 21B, a plurality of coil elements 2145 can be formed such that each coil element (e.g., coil elements 2100A-2100C) has the same cross-sectional profile and dimensions as described in relation to the coil element shown in FIG. 21A. The plurality of coil elements 2145 can include a space 2150 between adjacent protruding portions 2125 of adjacent coil elements. In some embodiments the space 2150 can be dimensioned to be a ⅙ of a wavelength of an electromagnetic wave provided through the MCG described herein. For example, the space 2150 can be a ⅙ of a wavelength of a millimeter electromagnetic wave injected into the borehole of a well. As further shown in FIG. 21B, the plurality of coil elements 2145 can include a pitch 2155. The pitch 2155 can be dimensioned to be a ⅓ of a wavelength of an electromagnetic wave provided through the MCG described herein. For example, the pitch 2155 can be a ⅓ of a wavelength of a millimeter electromagnetic wave injected into the borehole of a well. Other dimensions can be implemented as well.

Figure 22B:
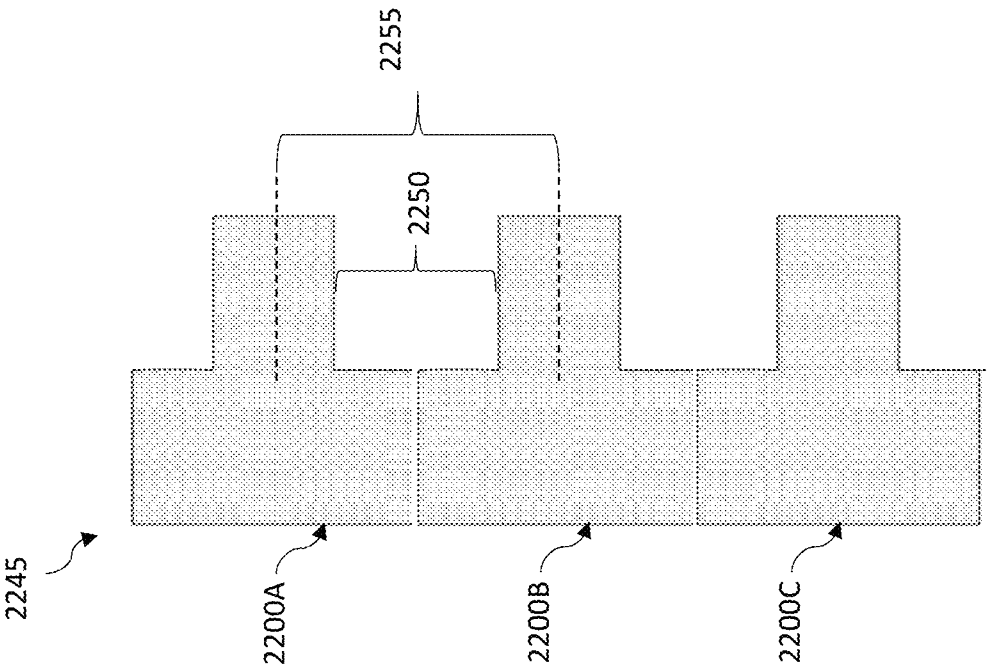
FIG. 22B is a diagram illustrating an exemplary embodiment of a plurality of coil elements, each coil element including a rectangular cross-sectional profile of a protruding portion as described herein.
Figure 22A:
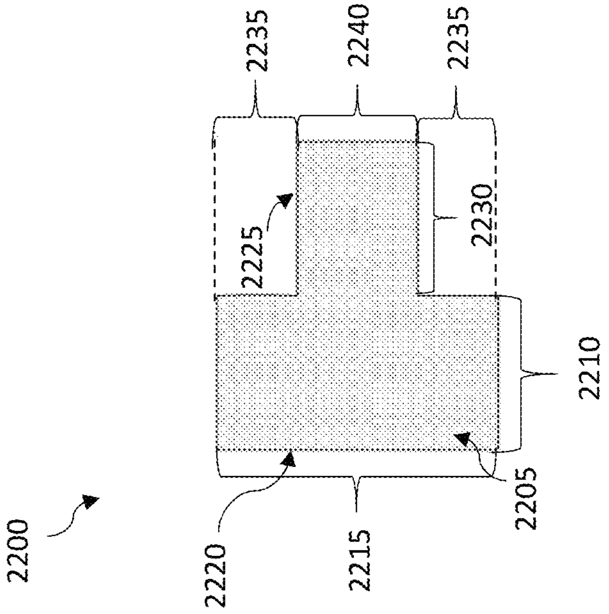
FIG. 22A is a diagram illustrating an exemplary embodiment of a rectangular cross-sectional profile of a protruding portion of a coil element of a multi-piece corrugated waveguide as described herein.

FIG. 22A is a diagram illustrating an exemplary embodiment of a rectangular cross-sectional profile of a protruding portion of a coil element of a multi-piece corrugated waveguide as described herein. As shown in FIG. 22A, a coil element 2200 can include a base portion 2205 and a protruding portion 2225 extending from the base portion 2205. The base portion 2205 can include a height 2210, a width 2215, and a back surface 2220. Although the base portion 2205 is shown with a rectangular-shaped profile, additional base portion profile shapes can be implemented. Similarly, although the back surface 2220 is shown as a flat-shaped back surface, additional back surface shapes or profiles can be implemented. In some embodiments, the height 2210 can include a height of 0.2 mm-0.4 mm, 0.3 mm-0.5 mm, 0.4 mm-0.6 mm, 0.5 mm-0.7 mm, 0.6 mm-1.0 mm, 2.0 mm-5.0 mm, 4 mm-8 mm, 6 mm-10 mm, or 12 mm-15 mm. In some embodiments, the height can be greater than 15 mm or less than 0.2 mm. Other heights are possible.

As shown in FIG. 22A, the coil element 2200 can include a protruding portion 2225 extending from the base portion 2205. The protruding portion 2225 can include a rectangular-shaped profile as shown in FIG. 22A, although other profile shapes can be implemented. The protruding portion 2225 can include a height 2230, an offset 2235, and a width 2240. In some embodiments, the offset 2235 can be the same or different on either side of the protruding portion 2225.

In some embodiments, the height 2230 can include a height that can be greater than or less than 0.2 mm-0.4 mm, 0.3 mm-0.5 mm, 0.4 mm-0.6 mm, 0.5 mm-0.7 mm, or 0.6 mm-1.0 mm, although other heights are possible. In some embodiments, the height 2230 can include a tolerance range, such as +/−0.010 mm, +/−0.020 mm, +/−0.030 mm, +/−0.040 mm, or +/−0.050 mm, although other tolerance ranges are possible.

In some embodiments, the offset 2235 can include an offset of 0.05 mm-0.1 mm, 0.075 mm-0.15 mm, 0.1 mm-0.15 mm, 0.125 mm-0.175 mm, 0.15 mm-0.2 mm, 0.175-0.25 mm, 0.2 mm-0.4 mm, 0.3 mm-0.5 mm, 0.4 mm-0.6 mm, 0.5 mm-0.7 mm, or 0.6 mm-1.0 mm. In some embodiments, the offset can be greater than 1.0 mm or less than 0.2 mm. Other offsets are possible. In some embodiments, the offset 2235 can include a tolerance range, such as +/−0.010 mm, +/−0.020 mm, +/−0.030 mm, +/−0.040 mm, or +/−0.050 mm, although other tolerance ranges are possible. In some embodiments, the offset 2235 can be the same on either side of the protruding portion 2225. In some embodiments, the offset 2235 on one side of the protruding portion 2225 can be different than an offset 2235 on an opposite side of the protruding portion 2225.

In some embodiments, the width 2240 can include a width of 0.2 mm-0.4 mm, 0.3 mm-0.5 mm, 0.4 mm-0.6 mm, 0.5 mm-0.7 mm, 0.6 mm-0.8 mm, 0.7 mm-0.9, or 0.8 mm-1.0 mm. In some embodiments, the width can be greater than 1.0 mm or less than 0.2 mm. Other widths are possible. In some embodiments, the width 2240 can include a tolerance range, such as +/−0.010 mm, +/−0.020 mm, +/−0.030 mm, +/−0.040 mm, or +/−0.050 mm, although other tolerance ranges are possible.

FIG. 22B is a diagram illustrating an exemplary embodiment of a plurality of coil elements, each coil element including a rectangular cross-sectional profile of a protruding portion as described herein. As shown in FIG. 22B, a plurality of coil elements 2245 can be formed such that each coil element (e.g., coil elements 2200A-2200C) has the same cross-sectional profile and dimensions as described in relation to the coil element shown in FIG. 22A. The plurality of coil elements 2245 can include a space 2250 between adjacent protruding portions 2225 of adjacent coil elements. In some embodiments the space 2250 can be dimensioned to be a ⅙ of a wavelength of an electromagnetic wave provided through the MCG described herein. For example, the space 2250 can be a ⅙ of a wavelength of a millimeter electromagnetic wave injected into the borehole of a well. As further shown in FIG. 22B, the plurality of coil elements 2245 can include a pitch 2255. The pitch 2255 can be dimensioned to be a ⅓ of a wavelength of an electromagnetic wave provided through the MCG described herein. For example, the pitch 2255 can be a ⅓ of a wavelength of a millimeter electromagnetic wave injected into the borehole of a well. Other dimensions can be implemented as well.

Figure 23B:
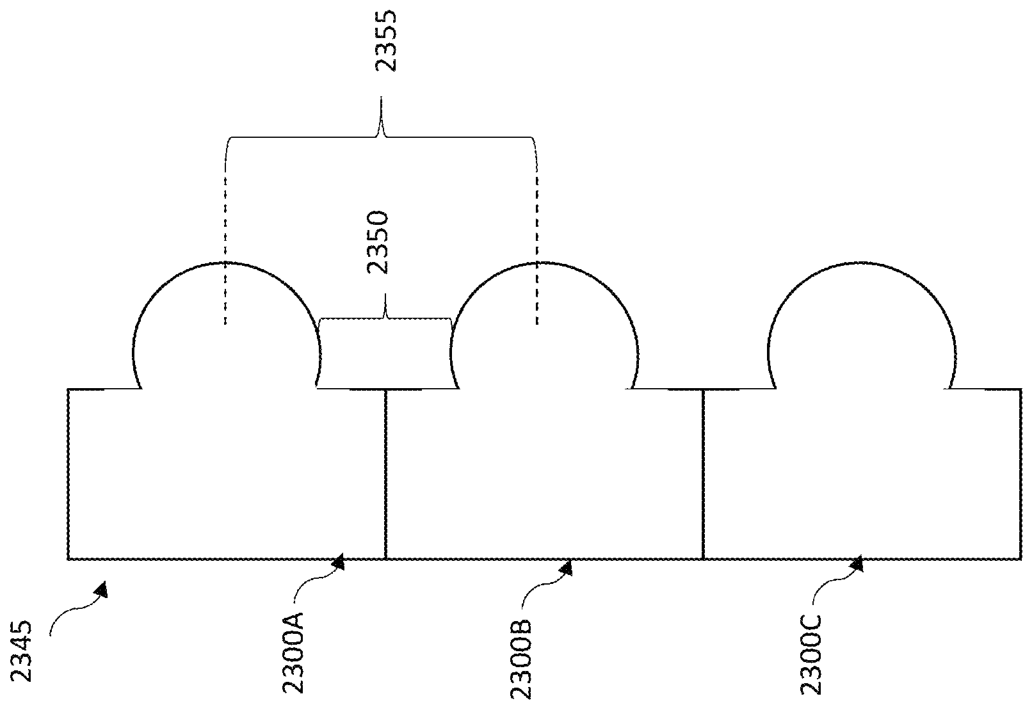
FIG. 23B is a diagram illustrating an exemplary embodiment of a plurality of coil elements, each coil element including a circular cross-sectional profile of a protruding portion as described herein.
Figure 23A:
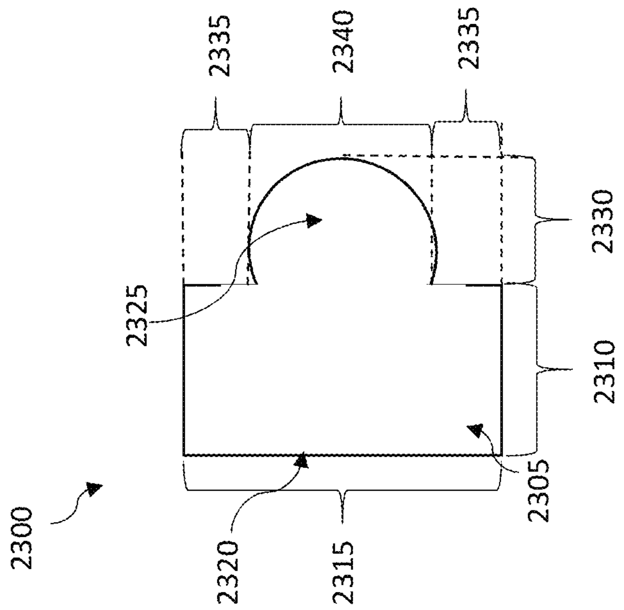
FIG. 23A is a diagram illustrating an exemplary embodiment of a circular cross-sectional profile of a protruding portion of a coil element of a multi-piece corrugated waveguide as described herein.

FIG. 23A is a diagram illustrating an exemplary embodiment of a circular cross-sectional profile of a protruding portion of a coil element of a multi-piece corrugated waveguide as described herein. As shown in FIG. 23A, a coil element 2300 can include a base portion 2305 and a protruding portion 2325 extending from the base portion 2305. The base portion 2305 can include a height 2310, a width 2315, and a back surface 2320. Although the base portion 2305 is shown with a rectangular-shaped profile, additional base portion profile shapes can be implemented. Similarly, although the back surface 2320 is shown as a flat-shaped back surface, additional back surface shapes or profiles can be implemented. In some embodiments, the height 2310 can include a height of 0.2 mm-0.4 mm, 0.3 mm-0.5 mm, 0.4 mm-0.6 mm, 0.5 mm-0.7 mm, 0.6 mm-1.0 mm, 2.0 mm-5.0 mm, 4 mm-8 mm, 6 mm-10 mm, or 12 mm-15 mm. In some embodiments, the height can be greater than 15 mm or less than 0.2 mm. Other heights are possible.

As shown in FIG. 23A, the coil element 2300 can include a protruding portion 2325 extending from the base portion 2305. The protruding portion 2325 can include a circular-shaped profile as shown in FIG. 23A, although other profile shapes can be implemented. The protruding portion 2325 can include a height 2330, an offset 2335, and a width 2340. In some embodiments, the offset 2335 can be the same or different on either side of the protruding portion 2325.

In some embodiments, the height 2330 can include a height of 0.2 mm-0.4 mm, 0.3 mm-0.5 mm, 0.4 mm-0.6 mm, 0.5 mm-0.7 mm, or 0.6 mm-1.0 mm. In some embodiments, the height can be greater than 1.0 mm or less than 0.2 mm. Other heights are possible. In some embodiments, the height 2330 can include a tolerance range, such as +/−0.010 mm, +/−0.020 mm, +/−0.030 mm, +/−0.040 mm, or +/−0.050 mm, although other tolerance ranges are possible.

In some embodiments, the offset 2335 can include an offset of 0.05 mm-0.1 mm, 0.075 mm-0.15 mm, 0.1 mm-0.15 mm, 0.125 mm-0.175 mm, 0.15 mm-0.2 mm, 0.175-0.25 mm, 0.2 mm-0.4 mm, 0.3-0.5 mm, 0.4 mm-0.6 mm, 0.5 mm-0.7 mm, or 0.6 mm-1.0 mm. In some embodiments, the offset can be greater than 1.0 mm or less than 0.2 mm. Other offsets are possible. In some embodiments, the offset 2335 can include a tolerance range, such as +/−0.010 mm, +/−0.020 mm, +/−0.030 mm, +/−0.040, or +/−0.050 mm, although other tolerance ranges are possible. In some embodiments, the offset 2335 can be the same on either side of the protruding portion 2325. In some embodiments, the offset 2335 on one side of the protruding portion 2325 can be different than an offset 2335 on an opposite side of the protruding portion 2325.

In some embodiments, the width 2340 can include a width of 0.2-0.4 mm, 0.3-0.5 mm, 0.4 mm-0.6 mm, 0.5 mm-0.7 mm, 0.6 mm-0.8 mm, 0.7 mm-0.9, or 0.8 mm-1.0 mm. In some embodiments, the width can be greater than 1.0 mm or less than 0.2 mm. Other widths are possible. In some embodiments, the width 2340 can include a tolerance range, such as +/−0.010 mm, +/−0.020 mm, +/−0.030 mm, +/−0.040, or +/−0.050 mm, although other tolerance ranges are possible.

FIG. 23B is a diagram illustrating an exemplary embodiment of a plurality of coil elements, each coil element including a circular cross-sectional profile of a protruding portion as described herein. As shown in FIG. 23B, a plurality of coil elements 2345 can be formed such that each coil element (e.g., coil elements 2300A-2300C) has the same cross-sectional profile and dimensions as described in relation to the coil element shown in FIG. 23A. The plurality of coil elements 2345 can include a space 2350 between adjacent protruding portions 2325 of adjacent coil elements. In some embodiments the space 2350 can be dimensioned to be a ⅙ of a wavelength of an electromagnetic wave provided through the MCG described herein. For example, the space 2350 can be a ⅙ of a wavelength of a millimeter electromagnetic wave injected into the borehole of a well. As further shown in FIG. 23B, the plurality of coil elements 2345 can include a pitch 2355. The pitch 2355 can be dimensioned to be a ⅓ of a wavelength of an electromagnetic wave provided through the MCG described herein. For example, the pitch 2355 can be a ⅓ of a wavelength of a millimeter electromagnetic wave injected into the borehole of a well. Other dimensions can be implemented as well.

Figure 24B:
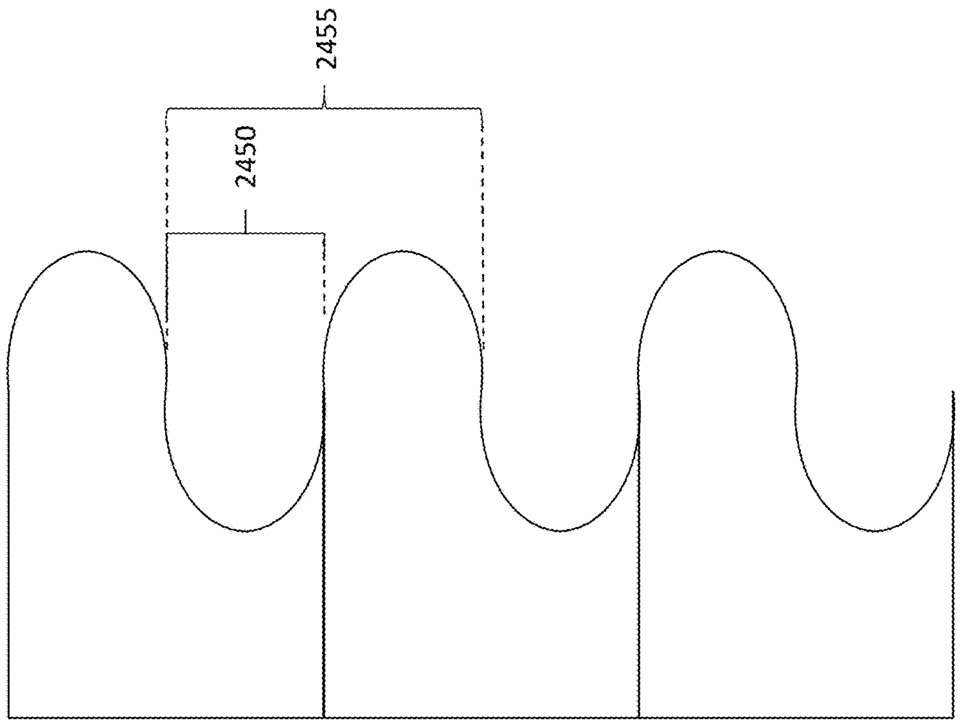
FIG. 24B is a diagram illustrating an exemplary embodiment of a plurality of coil elements, each coil element including a sinusoidal cross-sectional profile of a protruding portion as described herein.
Figure 24A:
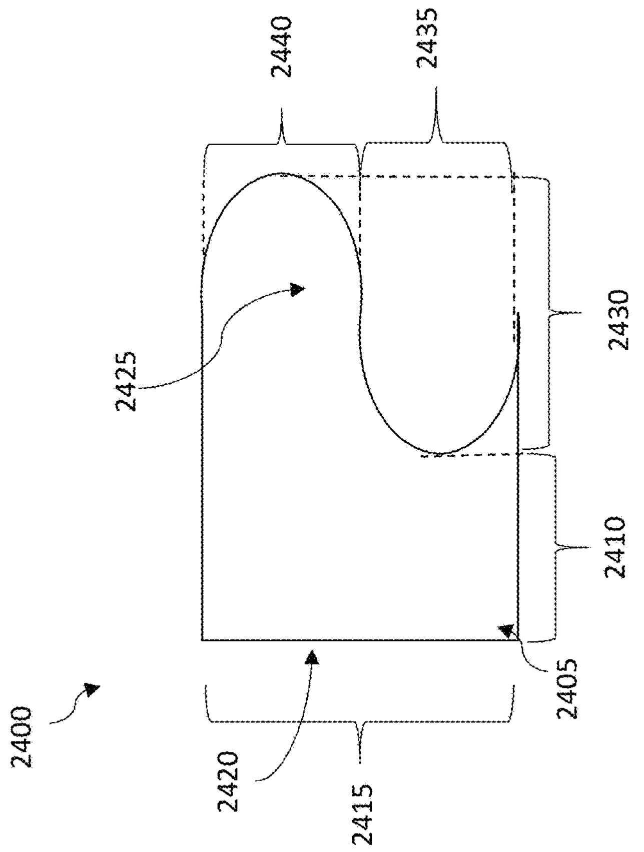
FIG. 24A is a diagram illustrating an exemplary embodiment of a sinusoidal cross-sectional profile of a protruding portion of a coil element of a multi-piece corrugated waveguide as described herein.

FIG. 24A is a diagram illustrating an exemplary embodiment of a sinusoidal cross-sectional profile of a protruding portion of a coil element of a multi-piece corrugated waveguide as described herein. As shown in FIG. 24A, a coil element 2400 can include a base portion 2405 and a protruding portion 2425 extending from the base portion 2405. The base portion 2405 can include a height 2410, a width 2415, and a back surface 2420. Although the base portion 2405 is shown with a rectangular-shaped profile, additional base portion profile shapes can be implemented. Similarly, although the back surface 2420 is shown as a flat-shaped back surface, additional back surface shapes or profiles can be implemented. In some embodiments, the height 2410 can include a height of 0.2-0.4 mm, 0.3-0.5 mm, 0.4 mm-0.6 mm, 0.5 mm-0.7 mm, 0.6 mm-1.0 mm, 2.0 mm-5.0 mm, 4 mm-8 mm, 6 mm-10 mm, or 12 mm-15 mm. In some embodiments, the height can be greater than 15 mm or less than 0.2 mm. Other heights are possible.

As shown in FIG. 24A, the coil element 2400 can include a protruding portion 2425 extending from the base portion 2405. The protruding portion 2425 can include a symmetrically-shaped sinusoidal profile as shown in FIG. 24A, although other shaped sinusoidal profiles can be implemented. In some embodiments, the protruding portion 2425 can have an angular profile, such as a triangular-shaped profile. In some embodiments, multiple protruding portions 2425 can extend from the base portion and each of the protruding portions can have the same or different profile shapes. The protruding portion 2425 can include a height 2430, an offset 2435, and a width 2440. In some embodiments, protruding portion 2425 can be arranged between two offsets 2435.

In some embodiments, the height 2430 can include a height of 0.2 mm-0.4 mm, 0.3 mm-0.5 mm, 0.4 mm-0.6 mm, 0.5 mm-0.7 mm, or 0.6 mm-1.0 mm. In some embodiments, the height can be greater than 1.0 mm or less than 0.2 mm. Other heights are possible. In some embodiments, the height 2430 can include a tolerance range, such as +/−0.010 mm, +/−0.020 mm, +/−0.030 mm, +/−0.040 mm, or +/−0.050 mm, although other tolerance ranges are possible.

In some embodiments, the offset 2435 can include an offset of 0.05 mm-0.1 mm, 0.075 mm-0.15 mm, 0.1 mm-0.15 mm, 0.125 mm-0.175 mm, 0.15 mm-0.2 mm, 0.175-0.25 mm, 0.2 mm-0.4 mm, 0.3-0.5 mm, 0.4 mm-0.6 mm, 0.5 mm-0.7 mm, or 0.6 mm-1.0 mm. In some embodiments, the offset can be greater than 1.0 mm or less than 0.2 mm. Other offsets are possible. In some embodiments, the offset 2435 can include a tolerance range, such as +/−0.010 mm, +/−0.020 mm, +/−0.030 mm, +/−0.040 mm, or +/−0.050 mm, although other tolerance ranges are possible. In some embodiments, the offset 2435 can be the same on either side of the protruding portion 2425. In some embodiments, the offset 2435 on one side of the protruding portion 2425 can be different than an offset 2435 on an opposite side of the protruding portion 2425.

In some embodiments, the width 2440 can include a width of 0.2 mm-0.4 mm, 0.3 mm-0.5 mm, 0.4 mm-0.6 mm, 0.5 mm-0.7 mm, 0.6 mm-0.8 mm, 0.7 mm-0.9, or 0.8 mm-1.0 mm. In some embodiments, the width can be greater than 1.0 mm or less than 0.2 mm. Other widths are possible. In some embodiments, the width 2440 can include a tolerance range, such as +/−0.010 mm, +/−0.020 mm, +/−0.030 mm, +/−0.040 mm, or +/−0.050 mm, although other tolerance ranges are possible.

FIG. 24B is a diagram illustrating an exemplary embodiment of a plurality of coil elements, each coil element including a sinusoidal cross-sectional profile of a protruding portion as described herein. As shown in FIG. 24B, a plurality of coil elements 2445 can be formed such that each coil element (e.g., coil elements 2400A-2400C) has the same cross-sectional profile and dimensions as described in relation to the coil element shown in FIG. 24A. The plurality of coil elements 2445 can include a space 2450 between adjacent protruding portions 2425 of adjacent coil elements. In some embodiments the space 2450 can be dimensioned to be a ⅙ of a wavelength of an electromagnetic wave provided through the MCG described herein. For example, the space 2450 can be a ⅙ of a wavelength of a millimeter electromagnetic wave injected into the borehole of a well. As further shown in FIG. 24B, the plurality of coil elements 2445 can include a pitch 2455. The pitch 2455 can be dimensioned to be a ⅓ of a wavelength of an electromagnetic wave provided through the MCG described herein. For example, the pitch 2455 can be a ⅓ of a wavelength of a millimeter electromagnetic wave injected into the borehole of a well. Other dimensions can be implemented as well.

Figure 25B:
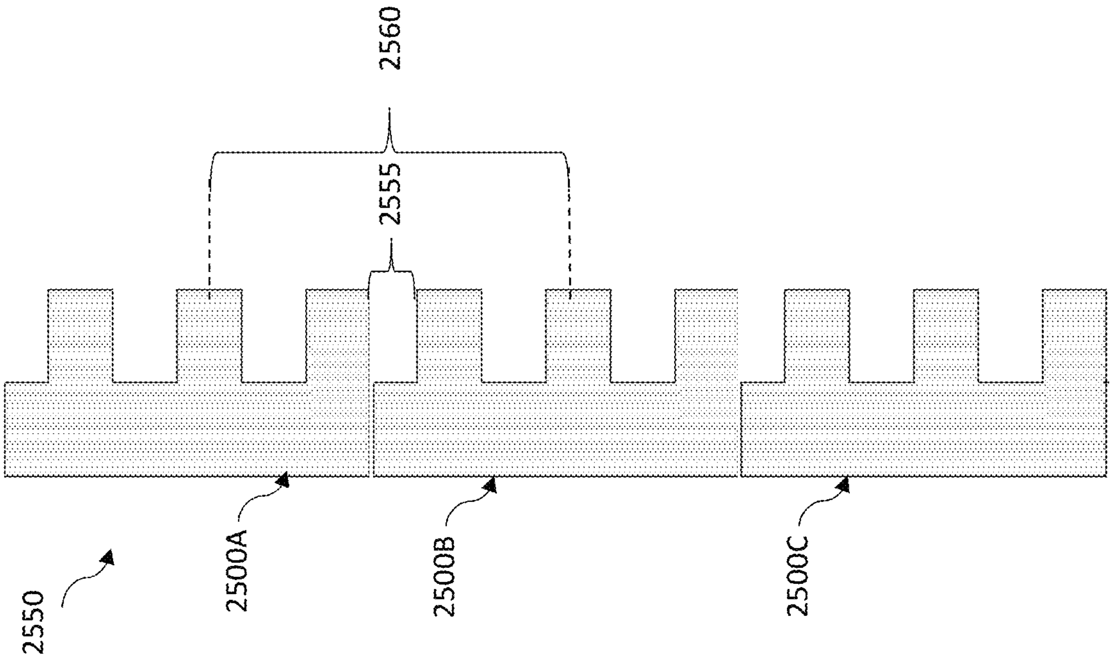
FIG. 25B is a diagram illustrating an exemplary embodiment of a plurality of coil elements, each coil element including a protruding portion having multiple cross-sectional profiles as described herein.
Figure 25A:
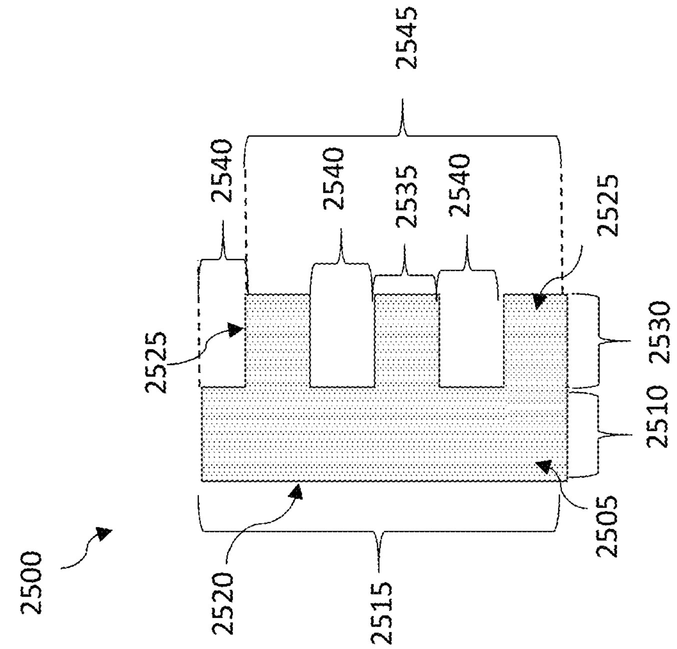
FIG. 25A is a diagram illustrating an exemplary embodiment of a protruding portion of a coil element including multiple cross-sectional profiles as described herein.

FIG. 25A is a diagram illustrating an exemplary embodiment of a protruding portion of a coil element including multiple cross-sectional profiles as described herein. As shown in FIG. a coil element 2500 can include a base portion 2505 and a protruding portion 2525 extending from the base portion 2505. The base portion 2505 can include a height 2510, a width 2515, and a back surface 2520. Although the base portion 2505 is shown with a rectangular-shaped profile, additional base portion profile shapes can be implemented. Similarly, although the back surface 2520 is shown as a flat-shaped back surface, additional back surface shapes or profiles can be implemented. In some embodiments, the height 2510 and/or the back surface 2520 can include a height of 0.2 mm-0.4 mm, 0.3 mm-0.5 mm, 0.4 mm-0.6 mm, 0.5 mm-0.7 mm, 0.6 mm-1.0 mm, 2.0 mm-5.0 mm, 4 mm-8 mm, 6 mm-10 mm, or 12 mm-15 mm. In some embodiments, the height can be greater than 15 mm or less than 0.2 mm. Other heights are possible.

As shown in FIG. 25A, the coil element 2500 can include multiple protruding portions 2525 extending from the base portion 2505. The protruding portions 2525 can each include a rectangular-shaped profile as shown in FIG. 25A, although other profile shapes can be implemented. In some embodiments, each of the multiple protruding portions 2525 can include the same shaped profile as shown in FIG. 25A. In some embodiments, one or more of the protruding portions 2525 can include a profile that is shaped differently from the profile shape of other protruding portions 2525. The protruding portions 2525 can include a height 2530, a width 2535, an offset 2540, and a combined protruding portion width 2545. In some embodiments, the height 2530 can include a height of 0.2 mm-0.4 mm, 0.3 mm-0.5 mm, 0.4 mm-0.6 mm, 0.5 mm-0.7 mm, or 0.6 mm-1.0 mm. In some embodiments, the height can be greater than 1.0 mm or less than 0.2 mm. Other heights are possible. In some embodiments, the height 2530 can include a tolerance range, such as +/−0.010 mm, +/−0.020 mm, +/−0.030 mm, +/−0.040 mm, or +/−0.050 mm, although other tolerance ranges are possible. In some embodiments, the height 2530 can be the same or different for adjacent or non-adjacent protruding portions 2525.

In some embodiments, the width 2535 can include a width of 0.2 mm-0.4 mm, 0.3 mm-0.5 mm, 0.4 mm-0.6 mm, 0.5 mm-0.7 mm, 0.6 mm-0.8 mm, 0.7 mm-0.9, or 0.8 mm-1.0 mm. In some embodiments, the width can be greater than 1.0 mm or less than 0.2 mm. Other widths are possible. In some embodiments, the width 2535 can include a tolerance range, such as +/−0.010 mm, +/−0.020 mm, +/−0.030 mm, +/−0.040 mm, or +/−0.050 mm, although other tolerance ranges are possible. In some embodiments, the width 2535 can be the same or different for adjacent or non-adjacent protruding portions 2525.

In some embodiments, the offset 2540 can include an offset of 0.05-0.1 mm, 0.075-0.15 mm, 0.1 mm-0.15 mm, 0.125 mm-0.175 mm, 0.15 mm-0.2 mm, 0.175 mm-0.25 mm, 0.2 mm-0.4 mm, 0.3 mm-0.5 mm, 0.4 mm-0.6 mm, 0.5 mm-0.7 mm, or 0.6 mm-1.0 mm. In some embodiments, the offset can be greater than 1.0 mm or less than 0.2 mm. Other offsets are possible. In some embodiments, the offset 2540 can include a tolerance range, such as +/−mm, +/−0.020 mm, +/−0.030 mm, +/−0.040 mm, or +/−0.050 mm, although other tolerance ranges are possible. In some embodiments, the offset 2540 can be the same on either side of the protruding portion 2525. In some embodiments, the offset 2540 on one side of the protruding portion 2525 can be different than an offset 2540 on an opposite side of a protruding portion 2525. In some embodiments, the offset 2540 can be the same or different with respect to non-adjacent protruding portions 2525.

In some embodiments, the combined protruding portion width 2545 can include a width of 0.2 mm-0.4 mm, 0.3 mm-0.5 mm, 0.4 mm-0.6 mm, 0.5 mm-0.7 mm, 0.6 mm-0.8 mm, 0.7 mm-0.9, 0.8 mm-1.0 mm, 0.9 mm-2.0 mm, 1.5 mm-3.0 mm, 2.5 mm-5.0 mm, 4.0 mm-8.0 mm, 6.0 mm-10.0 mm, 8.0 mm-15.0 mm, or 10.0 mm-20.0 mm. In some embodiments, the width can be greater than 20 mm or less than 0.2 mm. Other combined protruding portion widths are possible. In some embodiments, the combined protruding portion width 2545 can include a tolerance range, such as +/−0.010 mm, +/−0.020 mm, +/−0.030 mm, +/−0.040 mm, or +/−0.050 mm, although other tolerance ranges are possible.

FIG. 25B is a diagram illustrating an exemplary embodiment of a plurality of coil elements, each coil element including a protruding portion having multiple cross-sectional profiles as described herein. As shown in FIG. 25B, a plurality of coil elements 2550 can be formed such that each coil element (e.g., coil elements 2500A-2500C) has the same cross-sectional profile and dimensions as described in relation to the coil element shown in FIG. 25A. The plurality of coil elements 2550 can include a space 2555 between adjacent protruding portions 2525 of adjacent coil elements. In some embodiments the space 2555 can be dimensioned to be a ⅙ of a wavelength of an electromagnetic wave provided through the MCG described herein. For example, the space 2555 can be a ⅙ of a wavelength of a millimeter electromagnetic wave injected into the borehole of a well. As further shown in FIG. 25B, the plurality of coil elements 2550 can include a pitch 2560. The pitch 2560 can be dimensioned to be a ⅓ of a wavelength of an electromagnetic wave provided through the MCG described herein. For example, the pitch 2560 can be a ⅓ of a wavelength of a millimeter electromagnetic wave injected into the borehole of a well. Other dimensions can be implemented as well. The coil elements 2550 can be axially fixed inside an outer tube of the MCG described herein by bolts or utilizing an immediate part to connect them together and/or to the outer tube of the MCG described herein.

Figure 26A:
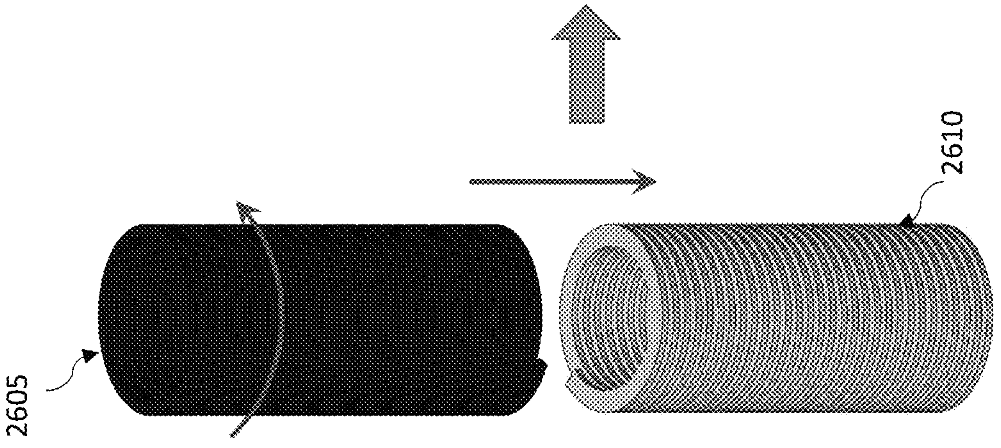
FIGS. 26A-26C are diagrams illustrating an exemplary embodiment of a multi-piece corrugated waveguide formed from two (2) nested coil springs as described herein.
Figure 26B:
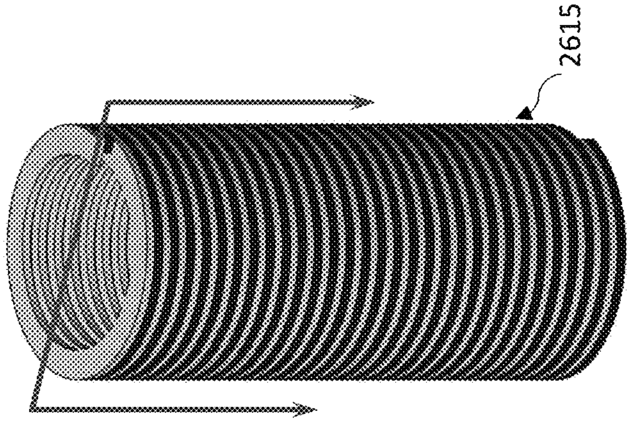
Figure 26C:
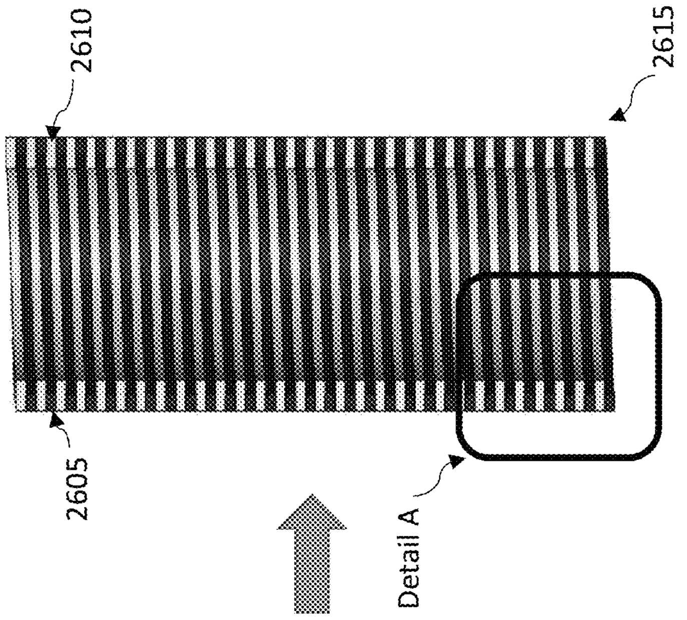

FIGS. 26A-26C are diagrams illustrating an exemplary embodiment of a multi-piece corrugated waveguide formed from two (2) nested coil springs as described herein. As shown in FIG. 26A, a first coil spring 2605 can be inserted into a second coil spring 2610 by rotating the first coil spring 2605 into the second coil spring 2610 such that the coil elements of each coil spring become threaded together as shown in the assembled 2-piece coil spring 2615 shown in FIG. 26B. FIG. 26C shows a cross-sectional view of the 2-piece coil spring 2615.

Figure 27:
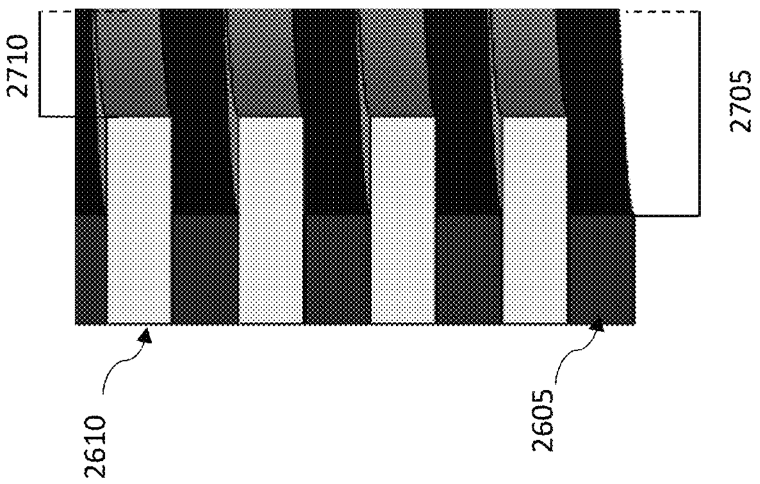
FIG. 27 is a diagram illustrating an exemplary embodiment of the multi-piece corrugated waveguide of FIG. 26C.

FIG. 27 is a diagram illustrating an exemplary embodiment of the multi-piece corrugated waveguide of FIG. 26C. As shown in FIG. 27, detail A of FIG. 26C is shown to illustrate the two coil springs nested together to create a profile of corrugation features corresponding to the diameter and pitch of the first coil spring 2605 and the second coil spring 2610. The first coil spring 2605 can have an inner diameter 2705 that is greater than the inner diameter 2710 of the second coil spring 2610. In some embodiments, the first coil spring 2605 can be coated with a first material, such as a dielectric or ferromagnetic material. The second coil spring 2610 can be coated with a second material, such as a conductive material.

Some implementations of the current subject matter can provide a multi-piece corrugated waveguide suitable for use with electromagnetic wave transmission. For example, some implementations of the current subject matter can enable formation and use of a corrugated waveguide suitable for drilling a borehole of a well using millimeter electromagnetic waves in a variety of transmission modes, such as HE11 mode. Some implementations of the multi-piece configuration of the corrugated waveguide described herein can reduce the complexity of manufacturing such apparatuses by providing corrugated waveguide features via a coil spring that can be inserted into a tube, instead of machining the corrugation features within long lengths of tube. As a result, some implementations of the MCG described herein can be manufactured at higher precision tolerances than forming the corrugated features via machining, tapping, or boring, which can leave machined material inside the waveguide and reduce electromagnetic transmissivity. Additionally, coating or plating components of the MCG can be more readily performed because insulative, dielectric, or conductive materials can be applied to individual components during manufacturing instead of coating or plating long lengths of tube with insulative, dielectric or conductive materials after corrugation features have been machined into the long tube lengths.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. An apparatus comprising:

an outer tube formed as a single body having an inner surface, an inner diameter, and a length greater than 1 meter; and an inner tube having an inner surface, an outer surface including a dielectric material on the outer surface, an outer diameter, and a helical-shaped groove formed on the inner surface and extending along a length of the inner tube, wherein the helical-shaped groove is configured to propagate a millimeter electromagnetic wave in an HE11 mode and the inner tube is positioned within the outer tube and the outer diameter of the inner tube is less than the inner diameter of the outer tube.

2. The apparatus of claim 1, wherein the cylindrical outer tube and/or the cylindrical inner tube are a coil tubing product or a pipe tubing product.

3. The apparatus of claim 1, wherein the outer tube and the inner tube are included in a tube assembly comprising a plurality of inner tubes arranged within a plurality of outer tubes, the tube assembly having a length greater than 10 km.

4. The apparatus of claim 1, wherein the outer tube and/or the inner tube include a metal material.

5. A method comprising:

forming a plurality of corrugation features on a first side of a sheet of metal stock, the sheet including a first edge and a second edge;

forming the sheet of metal stock into a first tube;

welding the first edge and the second edge together to seal the first tube, wherein the sealed first tube forms a corrugated waveguide; and inserting the sealed first tube into a second tube to form a multi-piece corrugated waveguide.

6. The method of claim 5, wherein the plurality of corrugation features on the first side of the sheet of metal stock are formed by rolling or stamping the plurality of corrugation features onto the first side of the sheet of metal stock.

7. A method comprising:

receiving a sheet of metal stock having a first surface, a first edge, and a second edge;

receiving a corrugation element immediately adjacent to the first surface of the sheet of metal stock, the corrugation element including a plurality of corrugation features;

forming the sheet of metal stock into a first tube containing the corrugation element within the first tube; and welding the first edge and the second edge together to seal the first tube, wherein the sealed first tube forms a multi-piece corrugated waveguide.

8. The method of claim 7, wherein the corrugation element is a coil spring.

9. The method of claim 7, wherein the corrugation element is a second tube including plurality of corrugation features formed on an inner surface of the second tube.

10. The method of claim 9, wherein the plurality of corrugation features on the inner surface of the second tube are formed by rolling or stamping the plurality of corrugation features onto the inner surface of the second tube.

* * * * *